(12) United States Patent
Park et al.

(10) Patent No.: US 11,070,277 B2
(45) Date of Patent: Jul. 20, 2021

(54) METHODS FOR TRANSMISSION AND RECEPTION OF DOWNLINK CONTROL INFORMATION, RELATING TO A BEAM STATUS REPORT, BETWEEN BASE STATION AND TERMINAL IN WIRELESS COMMUNICATION SYSTEM, AND DEVICES FOR SUPPORTING SAME

(71) Applicant: LG Electronics Inc., Seoul (KR)

(72) Inventors: Hanjun Park, Seoul (KR); Kijun Kim, Seoul (KR); Eunsun Kim, Seoul (KR); Inkwon Seo, Seoul (KR); Yunjung Yi, Seoul (KR); Suckchel Yang, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 16/319,596

(22) PCT Filed: Jul. 21, 2017

(86) PCT No.: PCT/KR2017/007900
§ 371 (c)(1),
(2) Date: Jan. 22, 2019

(87) PCT Pub. No.: WO2018/016921
PCT Pub. Date: Jan. 25, 2018

(65) Prior Publication Data
US 2020/0336193 A1    Oct. 22, 2020

Related U.S. Application Data

(60) Provisional application No. 62/364,857, filed on Jul. 21, 2016, provisional application No. 62/366,127, (Continued)

(51) Int. Cl.
*H04B 7/06* (2006.01)
*H04W 76/28* (2018.01)
(Continued)

(52) U.S. Cl.
CPC .......... *H04B 7/0695* (2013.01); *H04W 16/28* (2013.01); *H04W 56/001* (2013.01);
(Continued)

(58) Field of Classification Search
CPC .... H04B 7/0695; H04W 76/28; H04W 76/27; H04W 16/28; H04W 56/001; H04W 68/005
See application file for complete search history.

(56) References Cited

U.S. PATENT DOCUMENTS

| 2013/0121185 A1* | 5/2013 | Li | H04W 24/10 370/252 |
| 2013/0315321 A1* | 11/2013 | Rajagopal | H04L 27/261 375/260 |
| 2014/0198696 A1* | 7/2014 | Li | H04W 52/0229 370/311 |
| 2015/0049824 A1* | 2/2015 | Kim | H04B 7/0617 375/267 |

(Continued)

FOREIGN PATENT DOCUMENTS

KR  1020140096489 A  8/2014
KR  101459147 B1  11/2014
(Continued)

Primary Examiner — Jael M Ulysse
(74) Attorney, Agent, or Firm — Dentons US LLP

(57) ABSTRACT

Disclosed are methods for transmission and reception of downlink control information between a base station and a terminal, and devices for supporting same. Disclosed more particularly are: methods whereby a base station transmits downlink control information by means of an analogue beam independently determined for every one or more symbols (e.g., a unit of one or more symbols) and, in response to the base station, a terminal receives, by means of a serving beam of the terminal, the downlink control information transmitted by means of the analogue beam, which corresponds to the serving beam; and devices for supporting same.

12 Claims, 18 Drawing Sheets

Related U.S. Application Data filed on Jul. 25, 2016, provisional application No. 62/373,965, filed on Aug. 11, 2016, provisional application No. 62/376,418, filed on Aug. 18, 2016, provisional application No. 62/454,967, filed on Feb. 6, 2017.

(51) Int. Cl.
- *H04W 76/27* (2018.01)
- *H04W 16/28* (2009.01)
- *H04W 56/00* (2009.01)
- *H04W 68/00* (2009.01)
- *H04W 72/04* (2009.01)

(52) U.S. Cl.
CPC ....... *H04W 68/005* (2013.01); *H04W 72/042* (2013.01); *H04W 72/046* (2013.01); *H04W 76/27* (2018.02); *H04W 76/28* (2018.02)

(56) References Cited

U.S. PATENT DOCUMENTS

| | | | | |
|---|---|---|---|---|
| 2015/0124688 | A1* | 5/2015 | Xu | H04L 27/2607 370/312 |
| 2015/0139112 | A1* | 5/2015 | Park | H04B 7/0619 370/329 |
| 2015/0289281 | A1* | 10/2015 | Kim | H04B 7/0619 375/267 |
| 2016/0190707 | A1* | 6/2016 | Park | H01Q 3/24 370/334 |
| 2016/0242159 | A1* | 8/2016 | Ho | H04B 7/0617 |
| 2017/0181132 | A1* | 6/2017 | Xiao | H04L 5/0023 |
| 2017/0207843 | A1* | 7/2017 | Jung | H04B 7/0695 |

FOREIGN PATENT DOCUMENTS

| | | |
|---|---|---|
| KR | 1020150101750 A | 9/2015 |
| KR | 1020160082465 A | 7/2016 |

\* cited by examiner

METHODS FOR TRANSMISSION AND RECEPTION OF DOWNLINK CONTROL INFORMATION, RELATING TO A BEAM STATUS REPORT, BETWEEN BASE STATION AND TERMINAL IN WIRELESS COMMUNICATION SYSTEM, AND DEVICES FOR SUPPORTING SAME

This application is a 35 use § 371 national stage entry of international application No. PCT/KR2017/007900 filed on Jul. 21, 2017, and claims priority to U.S. provisional application No. 62/364,857 filed on Jul. 21, 2016, U.S. provisional application No. 62/366,127 filed on Jul. 25, 2016, U.S. provisional application No. 62/373,965 filed on Aug. 11, 2016, U.S. provisional application No. 62/376,418 filed on Aug. 18, 2016 and U.S. provisional application No. 62/454,967, filed on Feb. 6, 2017, all of which are hereby incorporated by reference in their entireties as if fully set forth herein.

TECHNICAL FIELD

The present disclosure relates to a wireless communication system, and more particularly, to methods of transmitting and receiving downlink control information between a terminal and a base station in a wireless communication system and devices for supporting the same.

More specifically, the present disclosure includes a method in which a base station transmits downlink control information using an analog beam independently determined per at least one symbol (e.g., on a one-symbol basis or on a two-symbol basis), a method in which a terminal receives downlink transmission information, which is transmitted through an analog beam corresponding to a serving beam for the terminal, using the serving beam and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present disclosure is to provide methods of transmitting and receiving downlink control information between a base station and a terminal in a newly proposed communication system.

In particular, the object of the present disclosure is to provide a method in which a base station transmits downlink control information using an analog beam independently determined per symbol and a method in which a terminal receives downlink transmission information, which is transmitted through an analog beam corresponding to a serving beam for the terminal, using the serving beam.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods and devices for transmitting and receiving downlink control information by a base station and a terminal in a wireless communication system. In particular, the present disclosure provides a method in which a base station transmits downlink control information using analog beams independently determined per symbol, a method in which a specific terminal receives downlink control information, which is transmitted through an analog beam corresponding to a serving beam applied to the specific terminal (or a hearable beam), using the serving beam (or the hearable beam), and devices therefor.

In an aspect of the present disclosure, provided is a method of transmitting downlink control information to one or more terminals by a base station in a wireless communication system. The method may include: transmitting the downlink control information to the one or more terminals using analog beams independently determined per at least one symbol in a resource region where the downlink control information is transmitted; and based on contents of the downlink control information, either receiving Beam State Information (BSI) or other uplink signals from some or all of the one or more terminals or transmitting paging information, system information, or other downlink signals to some or all of the one or more terminals.

In another aspect of the present disclosure, provided is a base station for transmitting to downlink control information to one or more terminals in a wireless communication system. The base station may include: a transmitter; a receiver; and a processor connected to the transmitter and the receiver. The processor may be configured to: transmit the downlink control information to the one or more terminals using analog beams independently determined per at least one symbol in a predetermined resource region; and based on contents of the downlink control information, either receive Beam State Information (BSI) or other uplink signals from some or all of the one or more terminals or transmit paging information, system information, or other downlink signals to some or all of the one or more terminals.

In this case, the base station may additionally transmit to the one or more terminals information on the resource region where the downlink control information is transmitted.

For example, when the resource region where the downlink control information is transmitted is composed of one or more time units (e.g., one or more subframes), the information on the resource region may include the number of consecutive time units; and periodicity or offset information applied to the resource region.

In addition, when the resource region where the downlink control information is transmitted is composed of one or more time units, time resources in the resource region where the downlink control information is transmitted may be identical to those for transmitting a Synchronization Signal (SS) or a Beam Reference Signal (BRS), and the downlink control information may be transmitted to the one or more terminals using an analog beam identical to that applied to the SS or the BRS per at least one symbol.

As another example, when the resource region where the downlink control information is transmitted is composed of several symbols in one or more time units, the information on the resource region may include information on a set composed of the one or more time units and information on locations of the several symbols included in the set composed of the one or more time units.

In this case, time resources in the resource region where the downlink control information is transmitted are different from those for a control signal for data transmission to some or all of the one or more terminals.

The downlink control information may include at least one of: first control information scheduling the paging information; second control information scheduling the system information; third control information indicating detection of a control channel region for downlink data transmission; fourth control information triggering reporting of the BSI; and fifth control information scheduling transmission of the uplink signals.

The contents of the downlink control information may be repeatedly transmitted using the analog beam independently determined per at least one symbol.

In addition, the downlink control information may include Beam State Information-Scheduling Request (BSI-SR) triggering information. In this case, the downlink control information may be transmitted as terminal-specific downlink control information or a terminal-specific reference signal. In particular, when the downlink control information is transmitted as the terminal-specific reference signal, the downlink control information may be transmitted by applying a terminal-specific sequence.

Moreover, in this case, the downlink control information may be transmitted by applying a Radio Network Temporary Identifier (RNTI) corresponding to a group consisting of a plurality of terminals. Further, the downlink control information may include a plurality of bit fields corresponding to the individual terminals of the group.

Additionally, the method may further include transmitting to the one or more terminals information on the analog beam applied per at least one symbol in order for the BS to transmit the downlink control information.

In this case, the information on the analog beam applied per at least one symbol in order for the BS to transmit the downlink control information may include information indicating that the analog beam applied per at least one symbol is Quasi Co-Located (QCLed) with a resource block in which a specific Synchronization Signal (SS) is transmitted or a Beam Reference Signal (BRS).

In still another aspect of the present invention, provided is a method of receiving downlink control information from a base station by a terminal in a wireless communication system. The method may include: receiving the downlink control information, which is transmitted through an analog beam corresponding to a serving beam for the terminal in at least one symbol in a resource region where the downlink control information is transmitted, using the serving beam; and based on contents of the downlink control information, either transmitting Beam State Information (BSI) or another uplink signal to the base station or receiving paging information, system information, or another downlink signal scheduled by the downlink control information from the base station.

In a further aspect of the present invention, provided is a terminal for receiving downlink control information from a base station in a wireless communication system. The terminal may include: a transmitter; a receiver; and a processor connected to the transmitter and the receiver. The processor may be configured to: receive the downlink control information, which is transmitted through an analog beam corresponding to a serving beam for the terminal in at least one symbol in a predetermined resource region, using the serving beam; and based on contents of the downlink control information, either transmit Beam State Information (BSI) or another uplink signal to the base station or receive paging information, system information, or another downlink signal scheduled by the downlink control information from the base station.

In this case, the terminal may additionally receive from the base station information on the resource region where the downlink control information is transmitted.

The downlink control information may include at least one of: first control information scheduling paging information; second control information scheduling system information; third control information indicating detection of a control channel region for downlink data transmission; fourth control information triggering reporting of the BSI; and fifth control information scheduling uplink signal transmission.

In this case, if the downlink control information includes the fourth control information (e.g., control information triggering reporting of the BSI), the terminal may operate as follows.

As an example, the terminal may transmit the BSI to the base station using a terminal-specific uplink control resource or a reference signal resource in one symbol.

a As another example, the terminal may determine location of a time period in which the terminal should report the BSI based on a location of the symbol in which the downlink control information is transmitted or an index of a time unit including the symbol. Thereafter, the terminal may report the BSI during the time period.

As a further example, the terminal may report the BSI during a time period indicated by the downlink control information.

The terminal may attempt to receive the downlink control information by switching to a wake-up state every predetermined cycle while operating in Discontinuous Reception (DRX) mode. In this case, if the received downlink control information includes the BSI-SR triggering information for the terminal, the terminal may transmit to the base station a BSI-SR for Beam Reference Signal (BRS) measurement and BSI reporting.

Thereafter, the terminal may receive from the base station control information triggering reporting of the BSI in response to the BSI-SR and transmit to the BS the BSI measured on an uplink data resource indicated by the received control information triggering the reporting of the BSI.

According to an embodiment of the present invention, the downlink control information may include either or both of control information only for the terminal and control information for one or more terminals including the terminal. In this case, the terminal may detect and receive the control information only for the terminal first before detecting and receiving the control information for the one or more terminals including the terminal.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, terminals can easily receive downlink control information transmitted after beamforming is applied in a newly proposed wireless communication system.

In particular, in the case of a terminal with high mobility or a terminal operating in Discontinuous Reception (DRX) mode, if the terminal resumes downlink signal reception after performing no downlink signal reception during a predetermined time, a serving beam configured by a base station may be different from a hearable beam from which the terminal can detect a downlink signal. According to the present disclosure, even in that case, the terminal can receive from the base station downlink control information with high reliability.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
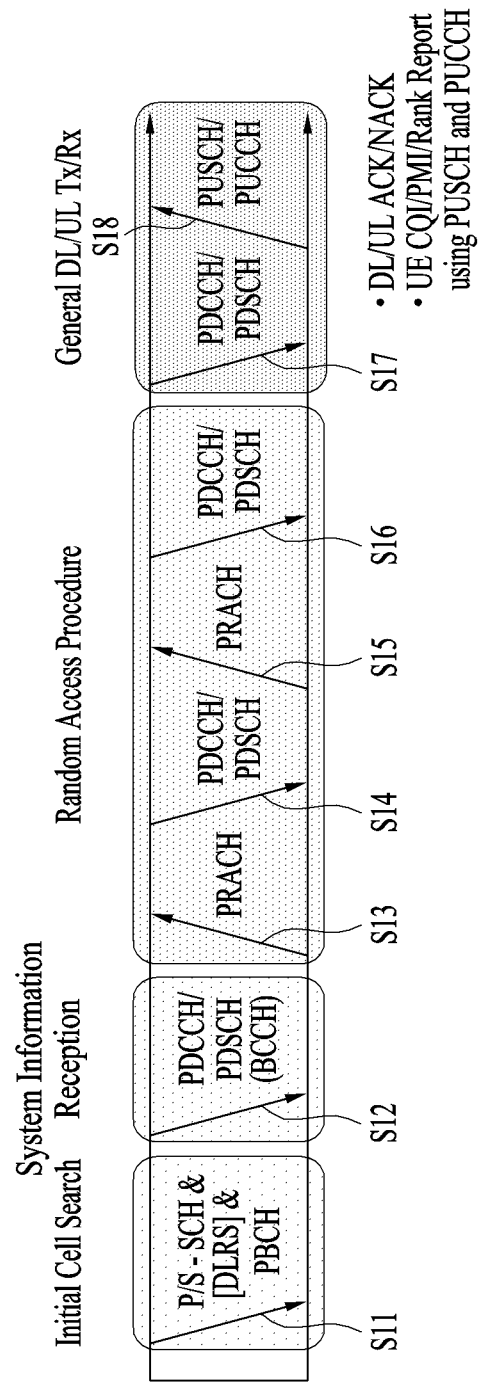
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1 Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2 Resource Structure

Figure 2:
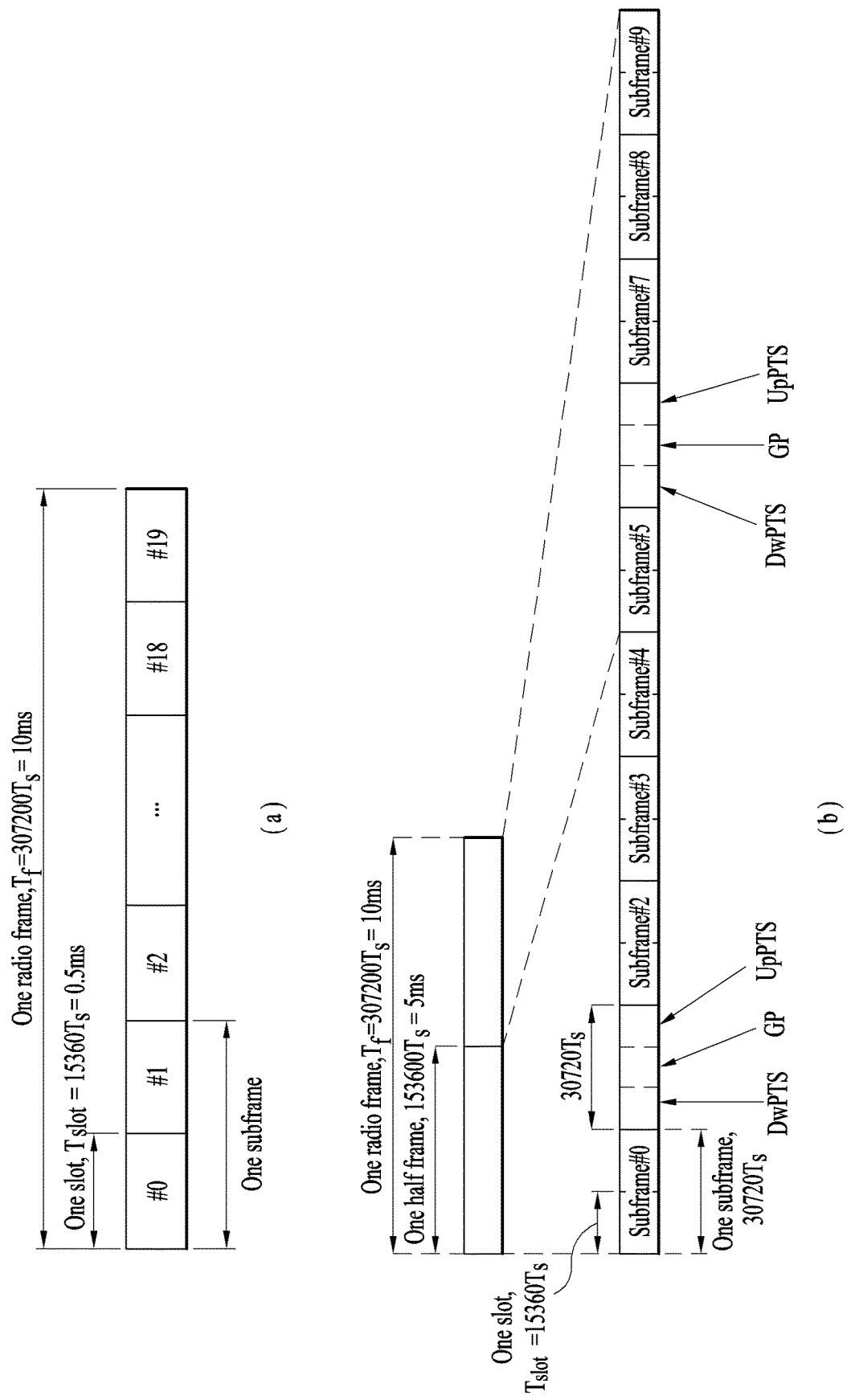
FIG. 2 is a diagram illustrating exemplary radio frame structures.

FIG. 2 illustrates exemplary radio frame structures used in embodiments of the present disclosure.

FIG. 2(*a*) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(*b*) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 11

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
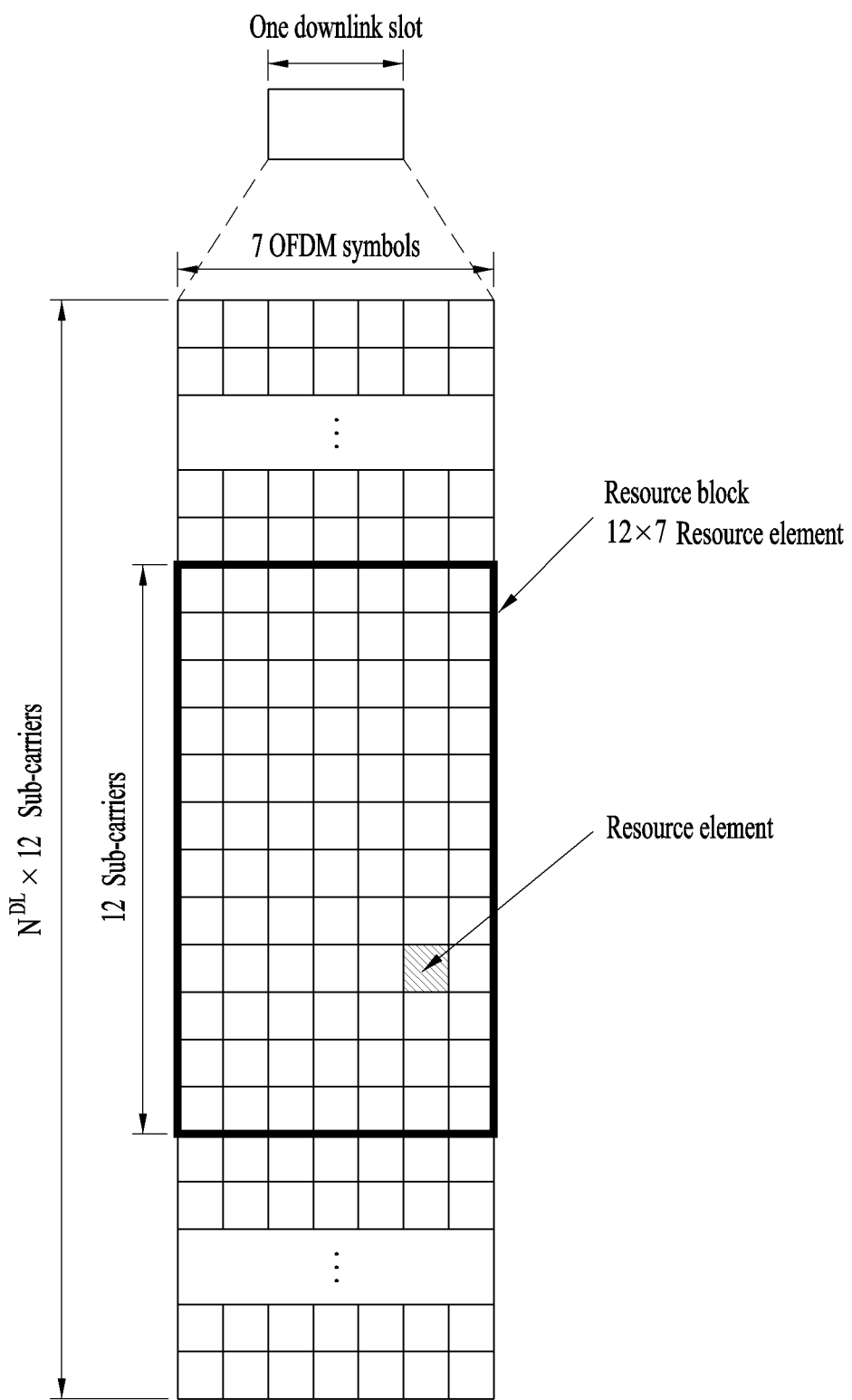
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
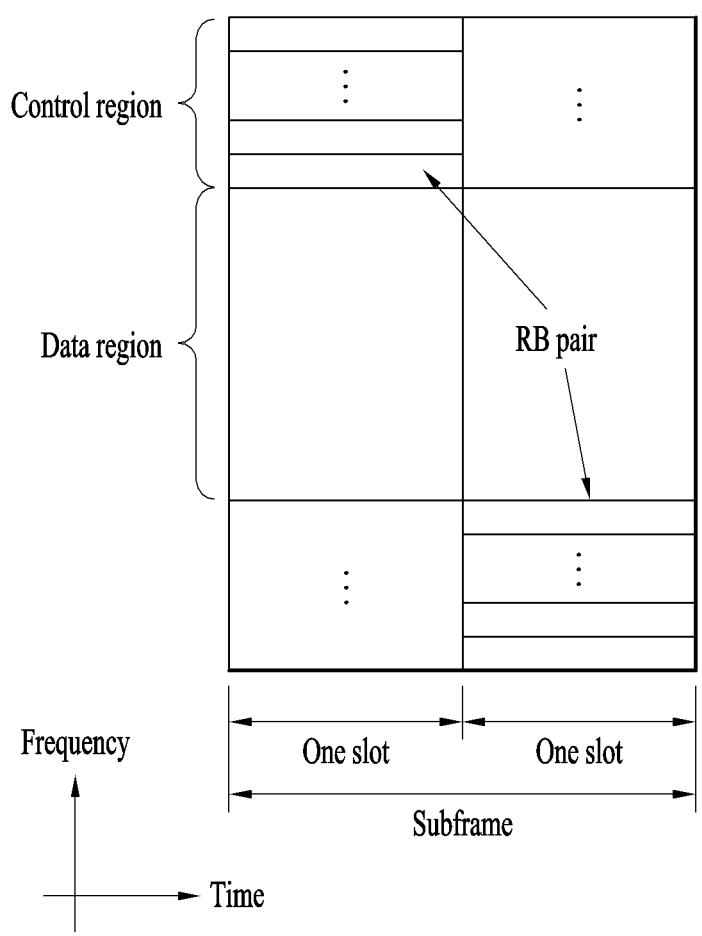
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
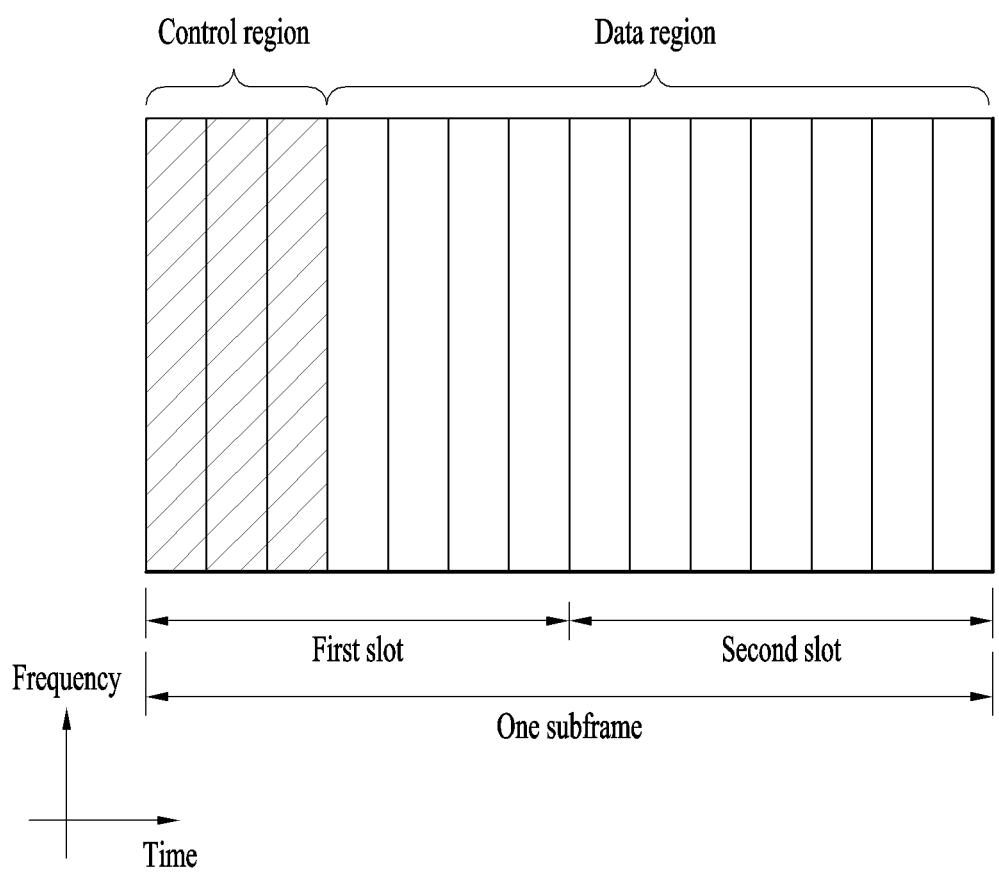
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 6:
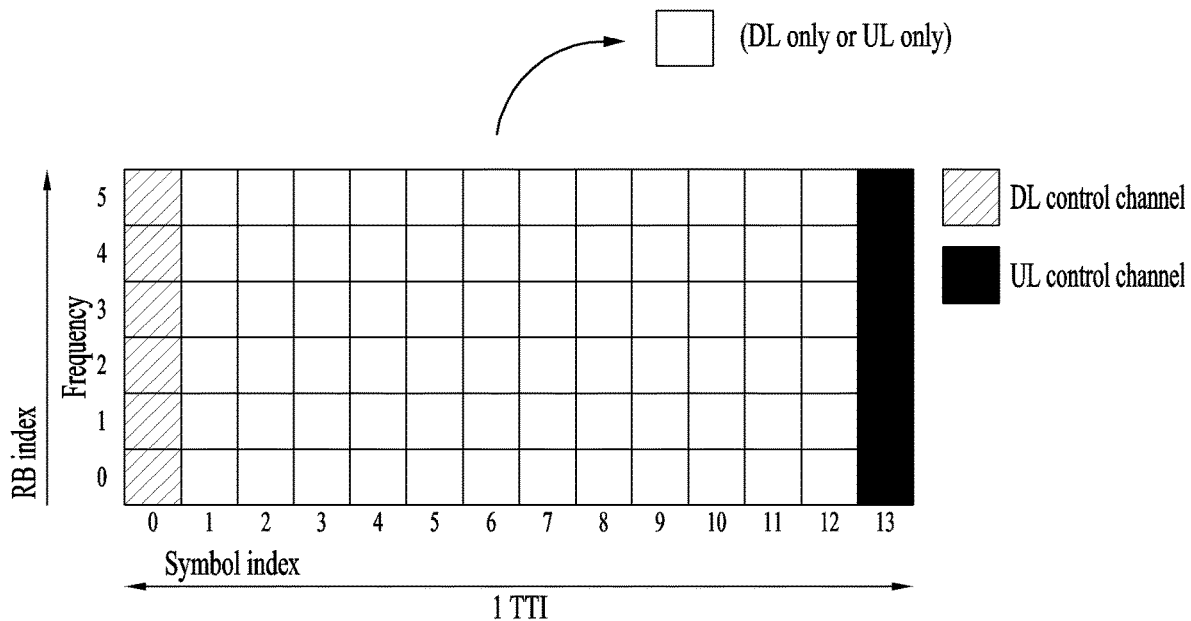
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing ($\Delta f$) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/ 4.69 μs | 2.60 μs/ 2.34 μs | 1.30 μs/ 1.17 μs | 0.65 μs/ 0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30

GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
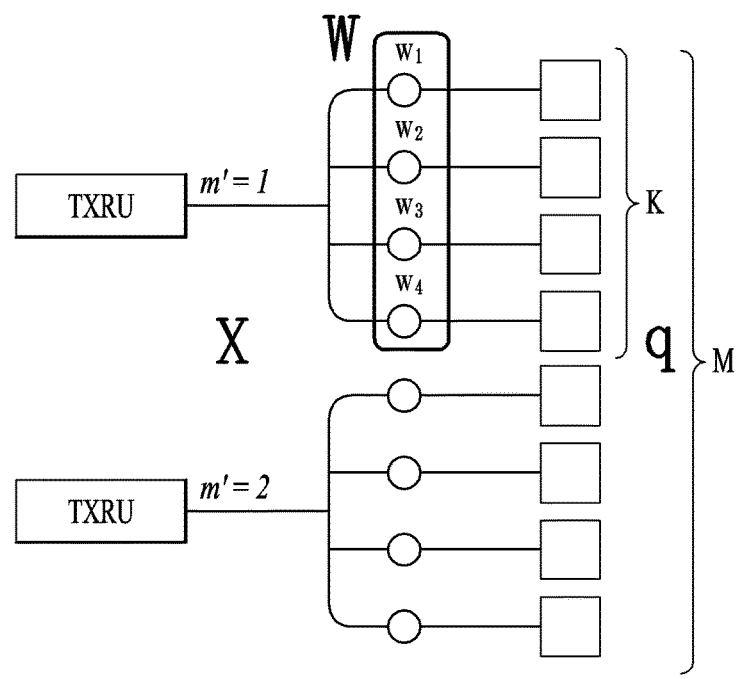
FIGS. 7 and 8 are diagrams illustrating representative methods for connecting TXRUs to antenna elements.
Figure 8:
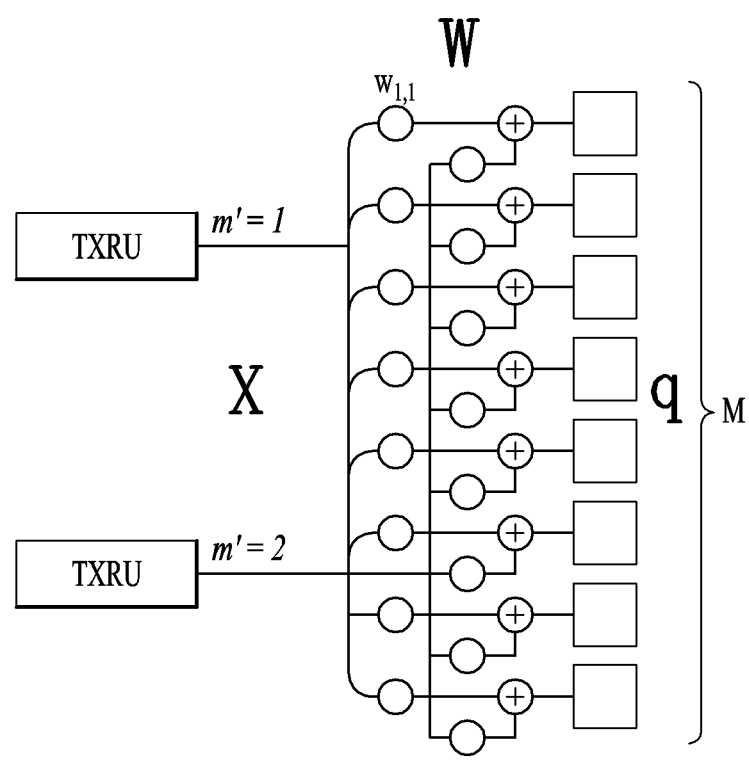

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

3. Proposed Embodiments

Hereinafter, a method by which a BS transmits DL control information to a UE in a DL control region where the BS can perform transmission by applying a different (or independent) analog beam (predefined between the BS and UE) per symbol (or per specific time unit) (hereinafter, such a DL control region is referred to as a beam sweeping DL control region) when managing analog beamforming that can be randomly changed over time will be described based on the above technical configurations.

For the above-described NR system, the network slicing method where a plurality of logical networks are implemented on a single physical network has been considered. The logical network should be able to support various services with different purposes (for example, enhanced Mobile Broadband (eMBB), massive Machine Type Communication (mMTC), Ultra-Reliable Low Latency Communication (URLLC), etc.). In addition, a flexible structure capable of applying an Orthogonal Frequency Division Multiplexing (OFDM) scheme with numerology suitable for a service to be provided has also been considered for radio communication (or physical layers) in the NR system. In other words, an OFDM scheme (or multiple access scheme) for supporting different numerology in each time and frequency resource region has been considered in the NR system.

Recently, data traffic has rapidly increased due to the advent of smart devices, and thus, it has been required that the NR system should be able to support much higher communication capacity (e.g., data throughput). In this case, a method of performing data transmission using multiple transmission (or reception) antennas may be considered to improve communication capacity. If digital beamforming is applied to multiple antennas, a Radio Frequency (RF) chain (i.e., a chain composed of RF devices such as a power amplifier, a down converter, etc.) and a D/A (or A/D) converter (i.e., a digital-to-analog converter or an analog-to-digital converter) need to be installed in each of the multiple antennas. However, this structure is not practical because of high hardware complexity and high power consumption.

Therefore, the present disclosure proposes to use a hybrid beamforming method where digital beamforming and analog beamforming are used together when multiple antennas are used in the NR system to which the present disclosure is applicable. Herein, the analog beamforming (or RF beamforming) means that precoding (or combining) is performed at an RF end.

Meanwhile, the hybrid beamforming means that precoding (or combining) is performed at baseband and RF ends, respectively. The hybrid beamforming is advantageous in that it can guarantee performance similar to the digital beamforming while reducing the number of RF chains and the number of D/A (or A/D) converters. For convenience of description, the hybrid beamforming structure can be represented as N Transceiver units (TXRUs) and M physical antennas in the following description. In this case, digital beamforming for L data layers to be transmitted at a transmitting end can be represented as an N*L matrix. Thereafter, N converted digital signals are converted into analog signals after passing through the TXRUs, and then analog beamforming expressed as an M*N matrix may be applied thereto.

Figure 9:
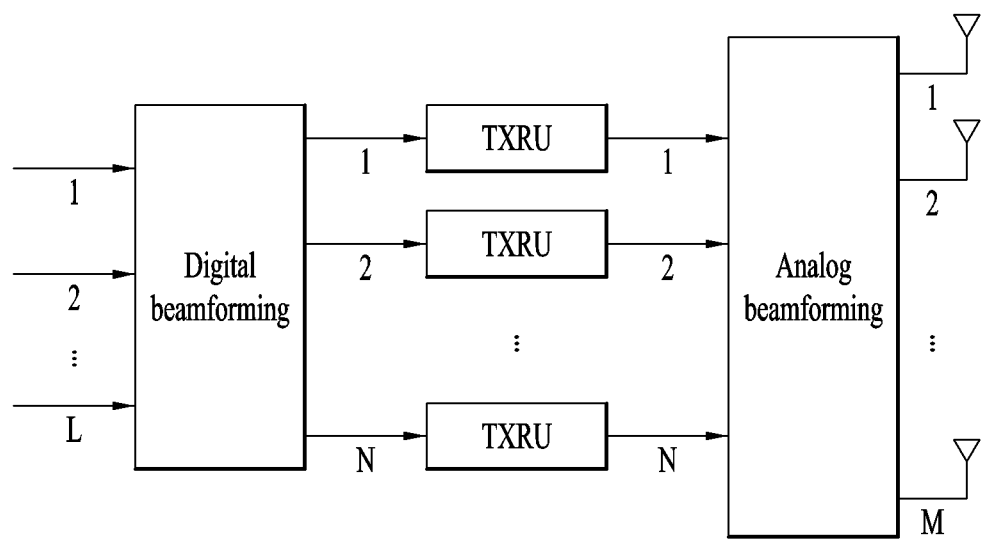
FIG. 9 is a diagram illustrating a hybrid beamforming structure in terms of TXRUs and physical antennas.

FIG. 9 illustrates a hybrid beamforming structure in terms of TXRUs and physical antennas. In FIG. 9, it is assumed that the number of digital beams is L and the number of analog beams is N.

Additionally, it is considered in the NR system to which the present disclosure is applicable that a BS is designed to change analog beamforming on a symbol basis in order to provide more efficient beamforming to a UE located in a specific area. Further, when one antenna panel is defined by N TXRUs and M RF antennas as shown in FIG. 9, the introduction of a plurality of antenna panels to which independent hybrid beamforming is applicable is also considered.

When a BS uses a plurality of analog beams as described above, each UE may prefer a different analog beam for signal reception. Thus, the NR system to which the present disclosure is applicable considers to support an operation in which a BS changes a plurality of analog beams on a symbol basis in a specific subframe at least with respect to Synchronization Signals (SSs), system information, paging, etc. (this operation is called beam sweeping). By doing so, the BS can provide all UEs with reception opportunities.

Figure 10:
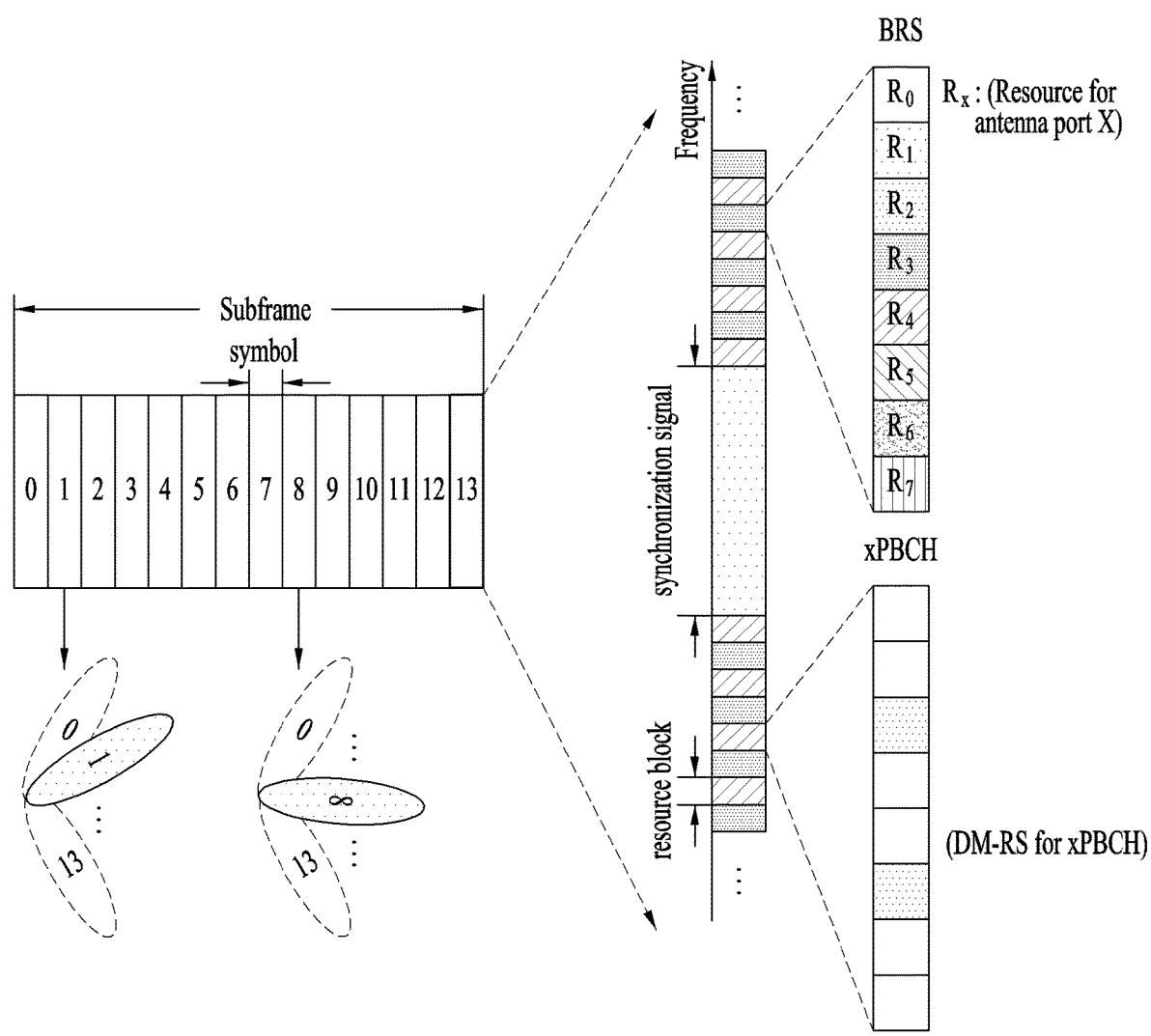
FIG. 10 is a diagram schematically illustrating a beam sweeping operation for an SS and system information during DL transmission.

FIG. 10 schematically illustrates a beam sweeping operation for an SS and system information during DL transmission. In FIG. 10, a physical resource (or channel) for broadcasting system information of the NR system to which the present disclosure is applicable is referred to as a physical broadcast channel (xPBCH).

In this case, analog beams belonging to different antenna panels can be simultaneously transmitted in one symbol.

In addition, the NR system to which the present disclosure is applicable considers the introduction of a Beam Reference Signal (BRS) corresponding to a Reference Signal (RS) that is transmitted by applying a single analog beam (corresponding to a specific antenna panel) as shown in FIG. 10 in order to measure a channel per analog beam. BRSs can be defined for a plurality of antenna ports, and each BRS antenna port may correspond to a single analog beam. In contrast to the BRS, all analog beams in an analog beam group may be applied to an SS or xPBCH to allow a random UE to correctly receive the SS or xPBCH.

Meanwhile, in the NR system to which the present disclosure is applicable, a BS can provide data to a UE using a specific analog beam (hereinafter such an analog beam is referred to as a serving beam) when transmitting a DL signal to the UE. To this end, the BS may provide the UE with information on a serving beam that the BS selects if necessary. If the UE is able to apply the analog beam when performing signal reception (for example, if the UE receives a signal by selecting/assuming the specific analog beam), the UE may attempt to receive the DL signal transmitted from the BS by applying receive (RX) analog beamforming suitable for the serving beam.

However, in the case of a UE with high mobility or a UE operating in Discontinuous Reception (DRX) mode (for example, when a UE operates alternately in sleeping mode where the UE does not attempt to detect any DL control signal and wakeup mode where the UE attempts to detect a DL control signal on a predetermined time basis for the purpose of saving battery power), if the UE resumes DL signal reception after performing no DL signal reception during a predetermined time, the serving beam configured by the BS may be different from an analog beam from which the UE can detect a DL signal (hereinafter such a beam is referred to as a hearable beam). For example, the UE may observe that a DL signal transmitted from the BS via the serving beam has low reception sensitivity (e.g., low SINR (signal to interference and noise power ratio)) but a DL signal transmitted via another analog beam (except the serving beam) has high reception sensitivity.

Figure 11:
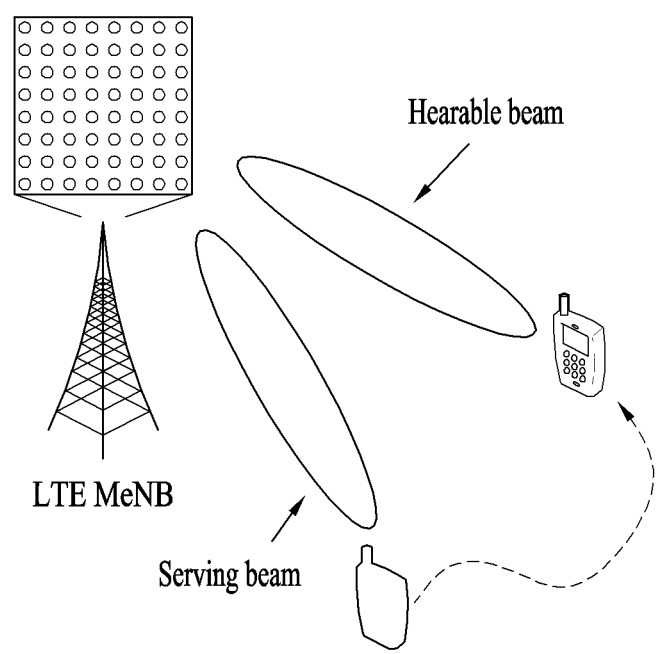
FIG. 11 is a diagram illustrating a case in which a serving beam used by a BS to transmit a DL signal to a UE is different from a hearable beam for the UE.

FIG. 11 illustrates a case in which a serving beam used by a BS to transmit a DL signal to a UE is different from a hearable beam for the UE.

As shown in FIG. 11, the serving beam configured by the BS may be different from the hearable beam from which the UE can detect a DL signal. Even when the serving beam configured by the BS is different from the hearable beam from which the UE can detect a DL signal as shown in FIG. 11, the UE can still exist within coverage of the corresponding BS.

Thus, the BS should be able to transmit, to the UE (having the hearable beam different from the serving beam), a DL control signal for requesting the UE to report paging information, system information, and information on the hearable beam. To support this operation, the BS should also be able to transmit a DL signal in multiple analog beam directions where it is expected that the UE includes at least one analog beam as the hearable beam.

In addition, the BS should be able to rapidly assist the UE in restoring the serving beam. To this end, when the UE determines (recognizes) that its serving beam is lost, the UE may request UL data transmission resources for reporting information on its analog beam(s) using previously configured resources (e.g., transmission resources, sequences, etc.) at a UL transmission time when it is expected that the BS will perform reception operation in multiple analog beam directions.

Accordingly, the present disclosure proposes a method in which a BS configures and utilizes a beam sweeping DL control region to efficiently transmit a DL control signal to a UE in multiple analog beam directions and relevant operations performed by the UE to receive the DL control signal based on the above-discussed technical features.

In addition, the present disclosure proposes a method in which a UE requests a BS to provide UL data transmission resources capable of transmitting analog beam information and transmits the analog beam information to the BS using the provided UL data transmission resources and relevant operations performed by the BS based on the above-discussed technical features.

In this specification, for convenience of description, an information report on a hearable beam for a UE (or an analog beam at a UE's receiver) is named a Beam State Information (BSI) report, and a DL control signal transmitted by a BS to request a UE to send a BSI report is named BSI report triggering Downlink Control Information (DCI).

In addition, a signal transmitted by a UE to request UL data transmission resources for a BSI report is named a Beam State Information-Scheduling Request (BSI-SR), and DL control information transmitted by a BS to request a UE to send a BSI-SR is named BSI-SR triggering DCI or a DL beam sweeping indicator.

Moreover, although it is assumed in the above configuration that a basic transmission unit is a subframe (SF), the SF may generally mean a Transmission Time Interval (TTI). In other words, although the present disclosure assumes one SF as the basic transmission unit for convenience of description, a slot or a frame can also be defined as the basic transmission unit. Further, a transmission resource region for a DL control signal scheduling UE's data reception in an SF is referred to as an x-Physical Downlink Control Channel (xPDCCH), and a data transmission resource region is referred to as an x-Physical Downlink Shared Channel (xPDSCH). Additionally, in the NR system to which the present disclosure is applicable, average received power (per resource element) for specific measurement resources for RRM measurement is defined as xRSRP, average received power where all signals in symbols are considered is defined as xRSSI, and a relative ratio between the xRSRP and xRSSI is defined as xRSRQ, as counterparts of the RSRP, RSSI, and RSRQ of the LTE system. Accordingly, Equation 1 below can be applied between the xRSRP, xRSSI, and xRSRP.

$$xRSRQ \propto xRSRP/xRSSI \qquad \text{[Equation 1]}$$

In this case, a BSI report transmitted from a UE may include M best beam groups (where M≥1) and an RRM measurement value (e.g., xRSRP, xRSRQ, etc.) per best beam (measured using a BRS to which a corresponding analog beam is applied).

Additionally, in the present specification, a resource region in which a BS can transmit a DL control signal by applying a different (or independent) analog beam (or analog beam group) to each of one or more consecutive symbols (different from those for an xPDCCH region) is defined as a beam sweeping DL control region, and the resource region is referred to as a BW-CCH region for convenience of description.

Additionally, an RS used (or known) for RRM measurement is referred to as an RRM RS, and a point where DL/UL transmission is performed to a UE is referred to as a Transmission and Reception Point (TRP). The TRP may correspond to a specific physical cell, a plurality of physical cell groups, or a specific analog beam (or analog beam groups). Further, an antenna port means a virtual antenna element where the same channel characteristics (e.g., delay profile, Doppler spread, etc.) can be assumed (at least in the same resource block).

Meanwhile, if a UE randomly transmits a BSI-SR to a BS according to its analog beam receiving state, the BS may unnecessarily transmit the BSI-SR to the UE even though the corresponding UE has no DL data to receive. In this case, the unnecessary BSI-SR transmission is disadvantageous in that it not only increases battery consumption of the UE but causes interference from the perspective of a network.

Therefore, the present disclosure proposes a method in which a BS configures a sweeping CCH region where a plurality of different (or independent) analog beams (or analog beam groups) can be applied per symbol and then transmits a BSI-SR triggering signal to a UE that the BS desires to call using UE-specific DCI or a UE-specific resource and/or sequence in the sweeping CCH region. According to the method, a UE can perform BSI-SR transmission only when a BS requests the BSI-SR transmission in a sweeping CCH region. Therefore, the method offers the following benefits: power saving at the UE, interference mitigation in the network, etc.

In this case, although such a BW-CCH region may be equal to a region in which an xPDCCH can be transmitted, the BW-CCH region can be distinguished from the xPDCCH region by applying at least one of the following items.

Radio Network Temporary Identifier (RNTI) (set): Different RNTIs may be used.

Scrambling ID: A scrambling ID used for a control channel or DCI may be transmitted together with a beam ID through a BW-CCH, whereas an ID transparent to the beam ID may be used for an xPDCCH.

DCI format or size: Different DCI may be used.

Transmission region: The two channels may be distinguished only by transmission regions.

Demodulation-Reference signal (DM-RS): For the two channels, different RSs may be used for demodulation.

Hereinafter, a method of transmitting a beam sweeping DL control signal applicable to the present disclosure will be described in detail.

3.1. Beam Sweeping DL Control Signal Transmission Method 3.1.1. First Beam Sweeping DL Control Signal Transmission Method ABS can configure a beam sweeping DL control (BW-CCH) region as follows.

(1) Type A: The BW-CCH region may be composed of consecutive SFs (or slots). To this end, a cycle in which the consecutive SFs (or slots) are transmitted and an offset may be provided to a UE. In this case, all symbols in the consecutive SFs (or slots) may be used as the BW-CCH region.

(2) Type B: The BW-CCH region may be composed of a specific SF set and symbols located at specific locations in an SF of the specific SF set.

In the case of BW-CCH configuration type B, BW-CCH symbols in an SF may be configured such that they do not overlap with DL control (xPDCCH) symbols detected by a UE for data reception and are always located after an xPDCCH region in the time domain.

As an example of BW-CCH configuration type A, the BS may define beam sweeping SFs in which SSs are transmitted as the BW-CCH region. In this case, the BS may define the BW-CCH region by excluding frequency resources for transmitting an SS, an xPBCH, or a BRS. According to BW-CCH configuration type A, the BS may not separately allocate beam sweeping SF resources for the BW-CCH region.

Figure 12:
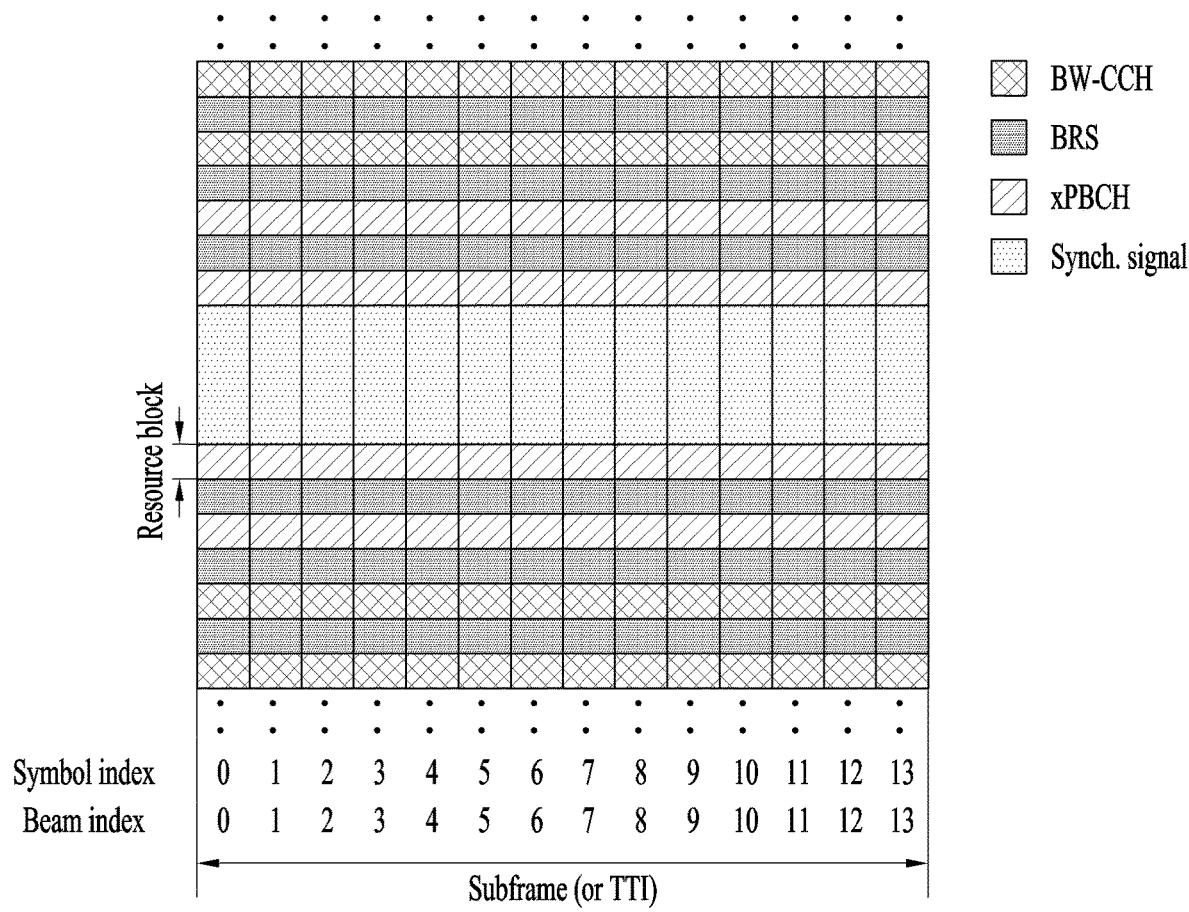
FIG. 12 is a diagram illustrating, as an example of BW-CCH configuration type A, a case in which a BW-CCH region is defined within a beam sweeping SF where an SS is transmitted.

FIG. 12 shows, as an example of BW-CCH configuration type A, a case in which a BW-CCH region is defined within a beam sweeping SF where an SS is transmitted. In this case, an analog beam (or analog beam group) applied to each symbol in the BW-CCH region may be equal to an analog beam (or analog beam group) applied to the SS. In other words, the BW-CCH region may be transmitted on the same time resources as the SS after applying the same analog beam (or analog beam group) as the SS per symbol.

When the BW-CCH region and a BRS are transmitted in the same symbol as shown in FIG. 12, some or all of the antenna port resources for the BRS may be used for a demodulation-reference signal (DM-RS) for the BW-CCH region without introduction of any extra RS. In other words, the BRS may be utilized for DCI demodulation in the BW-CCH region.

In contrast to BW-CCH configuration type A, in the case of BW-CCH configuration type B, an SF set may be defined for a BW-CCH region. In this case, specific symbols in an SF of the SF set may be set as the BW-CCH region.

Figure 13:
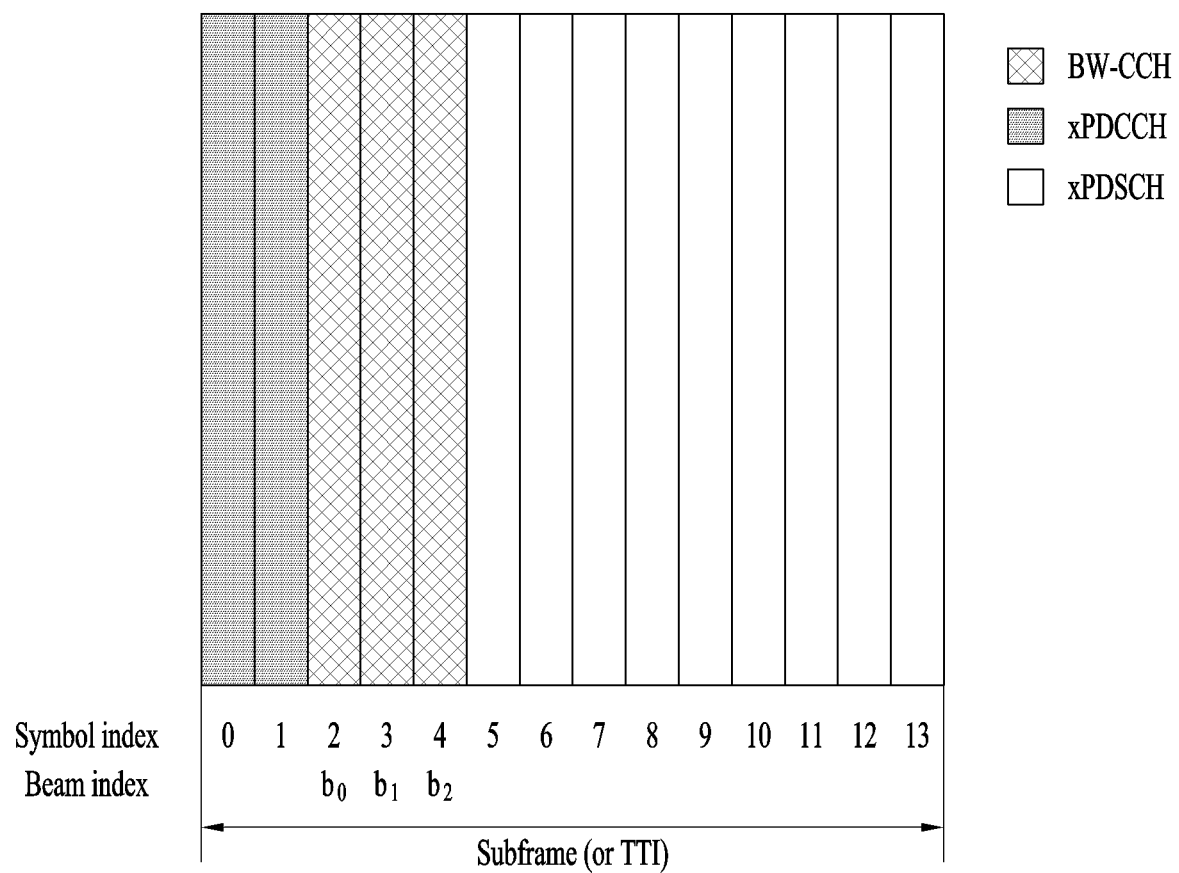
FIG. 13 is a diagram illustrating an example of BW-CCH configuration type B applicable to the present disclosure.

FIG. 13 shows an example of BW-CCH configuration type B applicable to the present disclosure.

According to BW-CCH configuration type B shown in FIG. 13, a BW-CCH region may be multiplexed with an xPDCCH region within a specific SF in the NR system to which the present disclosure is applicable. For example, it can be seen from FIG. 13 that in BW-CCH configuration type B, the BW-CCH region is composed of symbols after the xPDCCH region within the specific SF.

Figure 14:
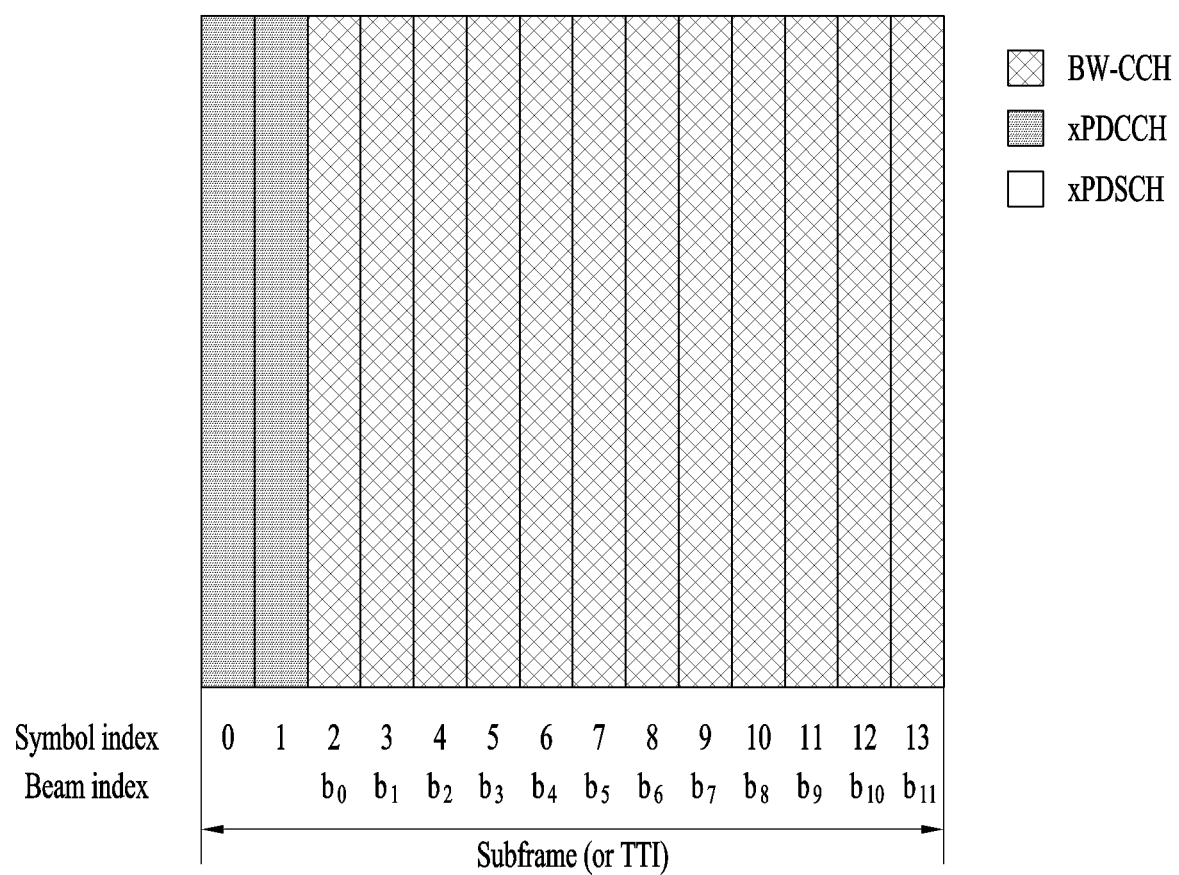
FIG. 14 is a diagram illustrating another example of BW-CCH configuration type B applicable to the present disclosure.

FIG. 14 shows another example of BW-CCH configuration type B applicable to the present disclosure. According to BW-CCH configuration type B shown in FIG. 14, a BW-CCH region may be composed of all symbols except an xPDCCH region within a specific SF.

When BW-CCH configuration type B shown in FIG. 13 or 14 is used in the NR system to which the present disclosure is applicable, it has an advantage in that a specific SF may not be used only for BW-CCH detection. For example, a UE may first attempt to detect DCI scheduling an xPDSCH in an xPDCCH region within an SF that is configured by a BS as a BW-CCH region. If there is data the UE should receive (e.g., xPDSCH) in the corresponding SF, the UE may not perform detection of DCI for the BW-CCH region by assuming that there is no BW-CCH region in the corresponding SF and then perform data reception. Thus, even when the BS configures the BW-CCH region in the SF, the BS may invalidate the BW-CCH region if necessary and use the BW-CCH region in the SF for data transmission.

3.1.2. Second Beam Sweeping DL Control Signal Transmission Method

A BS can configure information on a beam sweeping DL control (BW-CCH) region (or a time at which the BW-CCH region is transmitted) for a UE as follows.

(1) BW-CCH configuration type A

The BW-CCH region may be composed of SFs (or slots) in which SSs are transmitted.

The BW-CCH region may be configured based on the number of SFs (or slots) constituting one continuous period of the BW-CCH, a transmission cycle, and an offset according to a predetermined rule.

The BW-CCH region may be configured by BW-CCH configuration information transmitted via system information (e.g., xPBCH) or a higher layer signal.

The BW-CCH region may be composed of SFs (or slots) that can be derived from a time at which a specific RS (e.g., SS) is transmitted.

(2) BW-CCH configuration type B

The BW-CCH region may be configured using an SF set and BW-CCH symbols in an SF of the SF set according to a predetermined rule.

The BW-CCH region may be configured by BW-CCH configuration information transmitted via system information (e.g., xPBCH) or a higher layer signal.

The BW-CCH region may be composed of SFs (or slots) that can be derived from a time at which a specific RS (e.g., SS) is transmitted.

In this case, the SFs including the BW-CCH region may be indicated by specific assisting DCI (on a carrier different from that for transmitting the BW-CCH region).

In particular, the BS may use the BW-CCH region to transmit a DL control signal to UEs having their hearable beams different from serving beams. Since a hearable beam is identical to a serving beam in most cases, the BW-CCH region may be configured such that it is spaced at a predetermined time interval rather than every SF.

In this case, a BW-CCH transmission SF and symbol locations in the SF may be defined according to a predetermined rule. Alternatively, the BS may transmit the BW-CCH transmission SF and the symbol locations in the SF to a UE through system information or a higher layer signal if necessary.

In the case of BW-CCH configuration type A, BW-CCH transmission SFs (or slots) may be identical to SFs (or slots) in which SSs are transmitted as shown in FIG. 12.

Figure 15:
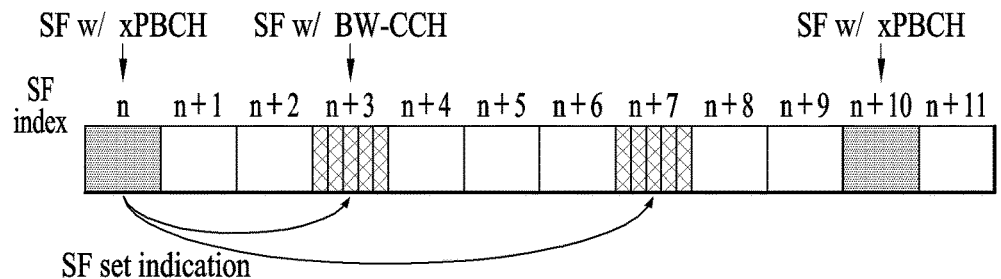
FIG. 15 is a diagram schematically illustrating an operation in which when transmitting periodic system information (e.g., xPBCH), a BS informs SFs including BW-CCH regions within a cycle of the system information through the system information.

FIG. 15 schematically illustrates an operation in which when transmitting periodic system information (e.g., xPBCH), a BS informs SFs including BW-CCH regions within a cycle of the system information through the system information.

More specifically, in the case of BW-CCH configuration type B, when a BS transmits periodic system information (e.g., xPBCH) as shown in FIG. 15, the BS may indicate SFs where BW-CCH regions exist within a cycle of the system information through the system information. For example, a plurality of SF set candidates (e.g., '001000100', '00001000') where BW-CCH regions can exist within a cycle of system information may be defined in advance, and then one (e.g., '001000100') of the candidates may be indicated through the system information. That is, SF #n+3 and SF #n+7 may be set to BW-CCH transmission SFs as shown in FIG. 15.

3.1.3. Third Beam Sweeping DL Control Signal Transmission Method

In this section, a method in which a BS transmits a BSI-SR triggering signal in a sweeping CCH region is proposed. In particular, available formats of a (UE-specific) BSI-SR triggering signal transmitted by a BS in a sweeping CCH region are also proposed in this section. Here, the BSI-SR triggering signal may be transmitted in one of the following forms.

(1) UE-specific DCI

For example, the following information may be configured in a UE-specific manner.

A search space for the DCI

A Radio Network Temporary Identifier (RNTI) for the DCI (2) UE-specific RS

For example, the following information may be configured in a UE-specific manner.

(Frequency-domain) Transmission resources for the RS

A sequence of the RS

When a BS performs BSI-SR triggering using the DCI, the corresponding DCI may include only BSI-SR triggering information without data scheduling information.

In addition, when the BS performs the BSI-SR triggering using the RS, the corresponding RS may be configured to be transmitted in one symbol.

Moreover, information on an analog beam (or analog beam group) applied to each symbol in the sweeping CCH region may be predetermined or transmitted to a UE through a higher layer signal (or system information).

More specifically, the BS may transmit control information by changing a plurality of analog beams on a symbol basis in the sweeping CCH region. By doing so, the BS may indicate to a specific UE that the BSI-SR triggering is performed through the control information.

To this end, the BS may transmit a UE-specific BSI-SR triggering signal to the specific UE. For example, the BS may transmit UE-specific DCI for the purpose of the BSI-SR triggering. Alternatively, the BS may configure UE-specific RS resources (e.g., frequency resources) and sequences for UEs (through a higher layer signal, etc.) first and then transmit an RS for the specific UE to the specific UE in order to perform the BSI-SR triggering.

In the latter case, the RS resources do not need to be orthogonal to each other and can be designed to have quasi-orthogonal properties. For example, the BS may use, as the BSI-SR triggering signal, a Constant Amplitude Zero Auto-Correlation (CAZAC) sequence such as a Zadoff Chu sequence and configure a UE-specific frequency resource for the CAZAC sequence, a root index (for a base sequence), and a Cyclic Shift (CS) value for each UE.

3.1.4. Fourth Beam Sweeping DL Control Signal Transmission Method

In this section, a method in which a BS transmits a BSI-SR triggering signal in a sweeping CCH region is proposed. In particular, a method in which a BS transmits a (UE-group-specific) BSI-SR triggering signal in a sweeping CCH region in one of the following forms is also proposed in this section.

UE-group-specific DCI is configured.

A plurality of fields with the same size are configured.

A field that each UE should monitor is configured per UE through RRC signaling in advance.

An RNTI for the DCI may be an extra RNTI previously configured for a UE group.

When a BS transmits a UE-specific BSI-SR triggering signal in a sweeping CCH region as described in section 3.1.3, the BS may repeatedly transmit the UE-specific BSI-SR triggering signal in all analog beam directions in the sweeping CCH region. In this case, if a number of UEs should perform BSI-SR transmission, a space for the BSI- SR triggering signal transmission may not be provided (or insufficient). In this case, the BS may not perform the BSI-SR triggering for some UEs.

However, according to the present disclosure, the BS can transmit the UE-group-specific DCI as a UE-group-specific BSI-SR triggering signal to more efficiently perform the BSI-SR triggering.

Figure 16:
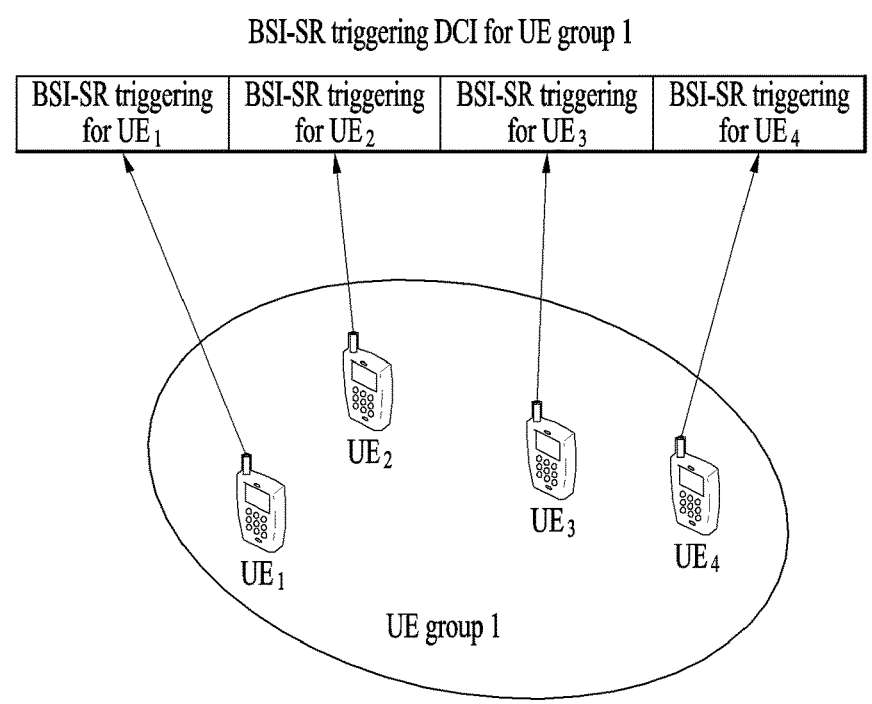
FIG. 16 is a diagram illustrating an operation in which a BS transmits UE-group-specific BSI-SR triggering signals according to an embodiment of the present disclosure.

FIG. 16 illustrates an operation in which a BS transmits UE-group-specific BSI-SR triggering signals according to an embodiment of the present disclosure. Specifically, FIG. 16 shows an example of BSI-SR triggering DCI when the maximum number of UEs included in a UE group (M) is 4.

As shown in FIG. 16, a BS may configure a group RNTI value for a UE group including a maximum of M UEs and transmit BSI-SR triggering DCI having the corresponding RNTI. In this case, the UE-group-specific BSI-SR triggering DCI may be composed of M bit fields with the same size. Accordingly, the BS may inform each UE of a group to which each UE belongs and group RNTI information and at the same time configures a bit field that each UE should monitor among the M bit fields included in the DCI through a higher layer signal. Thereafter, each UE may detect the UE-group-specific BSI-SR triggering DCI according to the group RNTI and check whether the BS indicates BSI-SR triggering to itself in the bit field that it should monitor in the corresponding DCI.

In this case, the group RNTI may be used for a search space and a cyclic redundancy check (CRC) mask for the UE-group-specific BSI-SR triggering DCI.

3.1.5. Fifth Beam Sweeping DL Control Signal Transmission Method

In this section, a method in which a BS transmits not only a BSI-SR triggering signal but also the following control information when intending to transmit the BSI-SR triggering signal in a sweeping CCH region is proposed.

DCI scheduling RRC reconfiguration

A DL or UL grant scheduling data transmitted by applying a beam diversity technique for the purpose of improving reliability DCI transmission when UL synchronization or UL beam direction is not configured or when DL beam information is insufficient A Transmit Power Control (TPC) command (e.g., 1 or 2 bits)

Random Access Response (RAR) scheduling DCI (or an RAR message)

More specifically, although the sweeping CCH region proposed by the present disclosure can be used to transmit DCI with a special purpose (for example, serving beam reconstruction) such as BSI-SR triggering DCI, if the size of the sweeping CCH region is sufficiently large, it can be considered that the sweeping CCH region is used for transmitting other control information.

Figure 17:
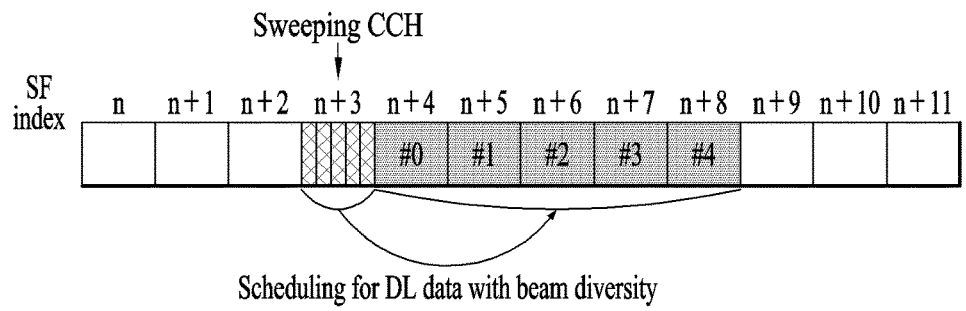
FIG. 17 is a diagram illustrating an operation performed when data to be repeatedly transmitted via five beams (e.g., beams #0, #1, #2, #3, and #4) is scheduled in a sweeping CCH region.

FIG. 17 illustrates an operation performed when data to be repeatedly transmitted via five beams (e.g., beams #0, #1, #2, #3, and #4) is scheduled in a sweeping CCH region.

To transmit important information to a UE losing a corresponding UL or DL beam (or a serving UL/DL beam), the BS may repeatedly transmit the same data by applying different analog beams to a plurality of subframes, respectively. In this case, the sweeping CCH region may be used to schedule data repeatedly transmitted in multiple analog beam directions (or data transmitted using the beam diversity technique) as shown in FIG. 17. For example, information on the RRC reconfiguration may be transmitted using the beam diversity technique.

3.2. Available DCI in Beam Sweeping DL Control Region 3.2.1. Types of Available DCI in Beam Sweeping DL Control Region A BS may transmit at least one of the following pieces of DCI in a beam sweeping DL control (BW-CCH) region.

(1) DCI scheduling paging information
(2) DCI scheduling system information (e.g., System Information Block (SIB))
(3) DCI indicating detection of an xPDCCH region within a predetermined time period (xPDCCH monitoring DCI)
(4) BSI report triggering DCI
(5) DCI indicating a change of a serving beam
(6) DCI scheduling UL transmission
(7) Aperiodic CSI reporting and/or report triggering DCI More specifically, when the BS requests a BSI report to reconfigure a serving beam for a UE having a hearable beam different from the serving beam, the BW-CCH region can be used as a connection path between the BS and UE. That is, the BW-CCH region can support transmission of BSI report triggering DCI.

After sending the BSI report, the UE may receive DCI indicating a change of the serving beam in the BW-CCH region. In this case, the UE may change the current serving beam to a serving beam indicated by the received DCI (or reported by the UE).

In addition, the BW-CCH region may be used for UEs having no defined serving beam. For example, assuming that the Radio Resource Control (RRC) state of the LTE system is introduced to the NR system to which the present disclosure is applicable and a UE is allocated a serving beam through RRC signaling, UEs in the RRC_IDLE state cannot receive paging information because they do not have any RRC connection, and thus no serving beam is defined therefor. Eventually, the UE cannot attempt DL reception based on the serving beam. In this case, the BS may transmit DCI scheduling the paging information to the UE using the BW-CCH region. In addition, the UE performs initial access to a corresponding TRP by receiving system information such as a Random Access Channel (RACH) configuration before receiving RRC signaling. Therefore, DCI scheduling the system information needs to be transmitted to the UE in the BW-CCH region before the serving beam is configured.

When paging information (or system information) is scheduled through the BW-CCH region as described above, it has an advantage in that a UE (in the RRC_IDLE mode) can wake up during a very short time period and check whether the paging information (or system information) is transmitted by exploring the BW-CCH region while operating in the DRX mode. If there is no BW-CCH region, the UE should detect a DL control region from potential SFs where the paging information (or system information) can be transmitted during a long period time, and it may cause rapid battery consumption.

After detecting the scheduling for the paging information (or system information) in the BW-CCH region, the UE may attempt xPDSCH reception in a series of DL SFs. Alternatively, as a 2-step method, the BS may transmit, through the BW-CCH region, DCI indicating detection of the DCI scheduling the paging information or system information in an xPDCCH region for specific SFs after a BW-CCH reception SF. Thereafter, the BS may transmit the DCI scheduling the paging information or system information and the corresponding in an SF where the detection of the xPDCCH region is indicated in the BW-CCH.

In this case, if there are sufficient resources in the BW-CCH region, it may be desirable to transmit DCI scheduling UL transmission (e.g., UL grant) in the BW-CCH region.

This may mitigate inefficiency caused by an xPDCCH region divided in a TDM manner when DL and UL grants in a (normal) DL SF have different analog beam directions (that cannot be transmitted at the same time).

In addition, a BS may transmit to a UE beam activity response triggering DCI in a BW-CCH region. Thereafter, if the UE detects (one or multiple pieces of) beam activity response triggering DCI corresponding to the best beam(s) from the perspective of reception, the UE may transmit an analog beam specific UL signal (e.g., analog beam specific RS) to the BS on a UL resource corresponding to a reception symbol of the beam activity response triggering DCI. Specifically, if UEs detect beam activity response triggering DCI for a specific analog beam, the UEs may simultaneously transmit a UL RS corresponding to the analog beam index in a UL symbol corresponding to the analog beam (or a DL symbol in which the beam activity response triggering DCI is transmitted). In other words, when detecting the same analog beam, the UEs may transmit the same RS in the same symbol.

Subsequently, if the BS detects the specific RS for the analog beam from UL symbols corresponding to the (one or multiple pieces of) beam activity response triggering DCI in the BW-CCH region, the BS can recognize the analog beams currently used by the UEs for signal reception. In other words, the BS may determine activity per analog beam.

In this case, the beam activity response triggering DCI does not need to be transmitted only in the BW-CCH region. That is, it can be transmitted in a normal DL control region (e.g., xPDCCH).

Moreover, DCI with different purposes transmitted in the BW-CCH region may be distinguished by a search space or an RNTI.

3.2.2. Available DCI Contents in Beam Sweeping DL Control Region and Operation According to DCI 3.2.2.1. First Example When a BS transmits DCI scheduling paging information or system information in a beam sweeping DL control (BW-CCH) region, a UE may make the following assumptions about an SF in which the paging information or system information scheduled by the DCI (in the BW-CCH region) is transmitted.

(1) The SF in which the scheduled paging information or system information is transmitted can be derived from an SF in which the DCI (in the BW-CCH region) is received. For example, if the DCI scheduling the paging information or system information is received in the nth SF, the UE may assume the SF in which the scheduled paging information or system information is transmitted to be the (n+k)th DL SF.

(2) The SF in which the scheduled paging information or system information is transmitted can be derived from a symbol in which the DCI (in the BW-CCH region) is received. For example, if the DCI is received in the 1th symbol of the nth SF, the UE may assume the SF in which the scheduled paging information or system information is transmitted to be the (n+k+1)th DL SF.

(3) The SF in which the scheduled paging information or system information is transmitted may be indicated by the DCI (in the BW-CCH region).

(4) The SF in which the scheduled paging information or system information is transmitted may be set to the earliest DL SF where an analog beam corresponding to the DCI (in the BW-CCH region) is configured after reception of the corresponding DCI.

However, the analog beam configured in the DL SF may be valid only when the BS transmits the DCI (in the BW-CCH region) corresponding to the corresponding analog beam.

In addition, the BS may inform the UE how an analog beam(s) corresponding to the (one or multiple pieces of) DCI (in the BW-CCH region) is configured in a DL SF(s) according to a predetermined rule or through the system information (e.g., paging configuration) or a higher layer signal.

In the above examples, the SF in which the paging information or system information is transmitted may be located after an SF in which the scheduling DCI is received.

More specifically, in some cases, depending on how the BW-CCH region is configured, an xPDSCH scheduled in the corresponding BW-CCH region may not be transmitted in the SF where the BW-CCH region is configured (when the BW-CCH region is valid).

For example, when the BW-CCH region is transmitted in an SF in which an SS is transmitted as shown in FIG. 12, a BW-CCH and an xPDSCH scheduled by the BW-CCH may not be transmitted in the SF because there are no remaining symbols in the SF.

As another example, when the BW-CCH region is valid as shown in FIG. 14, there are no remaining resources. Thus, a BW-CCH and an xPDSCH scheduled by the BW-CCH may not be transmitted in the same SF.

Therefore, depending on how the BW-CCH region is configured, only the DCI scheduling the paging information or system information may be transmitted in the SF where the BW-CCH region is present and the xPDSCH carrying the paging information or system information may not be transmitted in the corresponding SF.

Figure 18:
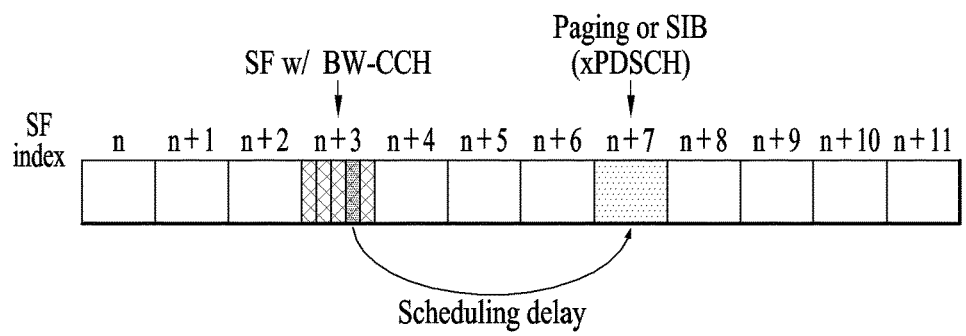
FIG. 18 is a diagram illustrating a configuration in which DCI scheduling paging information or system information in a BW-CCH region and the paging information or system information corresponding to the DCI is transmitted on an xPDSCH according to an embodiment of the present disclosure.

FIG. 18 illustrates a configuration in which DCI scheduling paging information or system information in a BW-CCH region and the paging information or system information corresponding to the DCI is transmitted on an xPDSCH according to an embodiment of the present disclosure.

To solve the above-described problem, a BS may transmit the paging information or system information corresponding to the DCI on the xPDSCH after a predetermined time offset (for example, in the (n+k+1)th SF) from a symbol of an SF in which the DCI scheduling the paging information or system information in the BW-CCH region is received (for example, in the 1th symbol of the nth SF) as shown in FIG. 18.

Alternatively, the BS may transmit location information of an SF in which the paging information or system information will be transmitted through the DCI transmitted in the BW-CCH region. For example, the BS may indicate an SF offset value or an SF index with respect to the SF in which the DCI is received. In addition, a UE may recognize that the paging information or system information is transmitted in the earliest SF with the SF index after the SF in which the DCI is received.

Additionally, the above-described operation can be extensively applied to the following general case: the xPDSCH is scheduled by the DCI in the BW-CCH region.

3.2.2.2. Second Example

When a BS transmits BSI report triggering DCI in a beam sweeping DL control (BW-CCH) region, the BS may indicate a specific analog beam (or analog beam group) through the BSI report triggering DCI and instruct UEs configured to use the analog beam (or at least one analog beam of the analog beam group) as their serving beam to report BSI.

In this case, if the BS designates an analog beam (or analog beam group) for the UE group, a UE may know an analog beam (or analog beam group) corresponding to specific BSI report triggering DCI using one of the following items.

(1) An analog beam (or analog beam group information) configured in a symbol in the BW-CCH region in which the corresponding BSI report triggering DCI is transmitted.

(2) An RNTI applied to the corresponding BSI report triggering DCI (or scrambled with a CRC of the DCI).

(3) An analog beam (or analog beam group) directly indicated by the corresponding BSI report triggering DCI.

More specifically, to reconfigure a serving beam for UEs having hearable beams different from the serving beam, the BS may request the UEs to report the BSI by transmitting the BSI report triggering DCI in the BW-CCH region. If the BS intends to transmit the BSI report triggering DCI through UE-specific DCI, the BS should repeatedly transmit the UE-specific BSI report triggering DCI in all symbols in the BW-CCH region because the BS does not have information on analog beams that the UEs can receive currently. In this case, if BSI report triggering is indicated to a number of UEs, the UE-specific BSI report triggering DCI may cause excessively high signaling overhead (for example, the number of UEs*DCI overhead*the number of symbols in the BW-CCH region) compared to the number of target UEs.

Therefore, the present disclosure proposes a method in which a BS transmits BSI report triggering DCI for a UE group. For example, a BS may indicate a specific analog beam (or analog beam group) and instruct UEs configured to use the analog beam (or at least one analog beam of the analog beam group) as a serving beam to report BSI.

According to the above-described UE-group-based BSI report triggering DCI transmission method, the BSI report triggering DCI can be transmitted even in an xPDCCH region without being limited to a specific search space. Therefore, the UE-group-based BSI report triggering DCI may be transmitted in various regions according to a BS configuration.

3.2.2.3 Third Example

When a UE is able to perform BSI reporting, the UE may perform the BSI reporting if at least one of the following conditions is satisfied:

(1) An RRM measurement value of a serving beam is equal to or less than a specific threshold ($T_0$); and (2) An RRM measurement value of a specific analog beam (except the serving beam) is more than the RRM measurement value of the serving beam by a predetermined value ($T_1$).

In this case, $T_0$ and $T_1$ may be predetermined or configured by the BS for the UE through system information (or a higher layer signal). In addition, the RRM measurement value may be xRSRP or xRSRQ measured using a BRS for the specific analog beam.

More specifically, when a BS requests a UE group to report BSI, a number of UEs can transmit their BSI reports in response to BSI report triggering as described in the above example. In this case, there may be a problem that UL resources are unnecessarily wasted.

Figure 19:
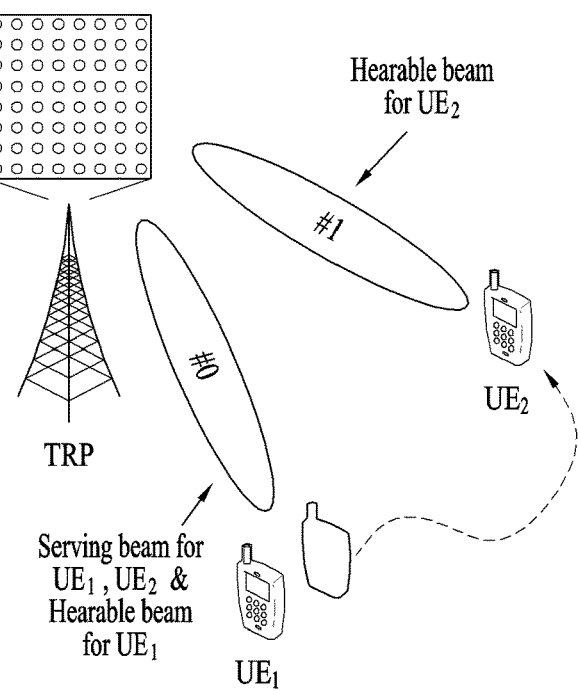
FIG. 19 is a diagram illustrating a case where when there are two UEs ($UE_1$ and $UE_2$) allocated beam #0 as a serving beam, $UE_1$ has a hearable beam equal to the serving beam and $UE_2$ has a hearable beam different from the serving beam.

FIG. 19 illustrates a case where when there are two UEs ($UE_1$ and $UE_2$) allocated beam #0 as a serving beam, $UE_1$ has a hearable beam equal to the serving beam and $UE_2$ has a hearable beam different from the serving beam. In FIG. 19, the serving beam (e.g., beam #0) and hearable beam (e.g., beam #1) of $UE_2$ may vary for various reasons (e.g., DRX, etc.).

When the BS triggers only a BSI report on beam #0 as shown in FIG. 19, it may be desirable that only $UE_2$ responds to the BSI report triggering in terms of efficient use of UL resources.

Therefore, the present disclosure proposes the following method. First, a BS and a UE determine conditions required for BSI reporting in advance. Thereafter, even though the UE receives BSI report triggering, the UE performs the BSI reporting only when a specific condition is satisfied. Here, the conditions required for the BSI reporting may include: when the reception sensitivity of its serving beam decreases (that is, the xRSRP of the serving beam is equal to or less than a predetermined threshold); or when the UE detects an analog beam much better than the serving beam (that is, the RRM measurement value of a specific analog beam (except the serving beam) is equal to or more than the RRM measurement value of the serving beam).

3.3 UE Reception Operation in Beam Sweeping DL Control Region 3.3.1 First UE Reception Operation in Beam Sweeping DL Control Region When a beam sweeping DL control (BW-CCH) region exists in a specific SF, a UE can receive a DL control signal in the corresponding SF as follows.

(1) In the case of BW-CCH configuration type A, the UE may attempt DCI detection only in the BW-CCH region.

(2) In the case of BW-CCH configuration type B, the UE may attempt DCI detection in an xPDCCH region as well as the BW-CCH region.

However, in the case of BW-CCH configuration type B, the UE may perform the detection in the xPDCCH region first. If DCI indicating data scheduling exists in the corresponding SF, the UE may drop the detection in the BW-CCH region.

Meanwhile, in the case of BW-CCH configuration type A, since an xPDCCH region is used for a BW-CCH in an SF (or slot) where the BW-CCH is transmitted, a UE does not need to perform detection in the xPDCCH region as described in section 3.1. For example, when a BW-CCH region is configured in an SF (or slot) where an SS is transmitted as shown in FIG. 12, a UE may detect a DL control signal only in the BW-CCH region because there is no xPDCCH region.

On the other hand, in the case of BW-CCH configuration type B, an xPDCCH region may exist in a BW-CCH transmission SF as shown in FIG. 13 or 14. In this case, a UE may perform detection in the xPDCCH region within the BW-CCH transmission SF first. Thereafter, depending on DCI detection results in the xPDCCH region, the UE may operate in a different way as follows.

1) When DCI (e.g., DL grant and/or UL grant) is detected in the xPDCCH region,

A) the UE determines that the BW-CCH region is invalid and assumes the corresponding SF to be a normal DL SF scheduling an xPDSCH, or B) the UE determines that a part of the BW-CCH region, which is an overlapping portion between the BW-CCH region and a scheduling region of a PDSCH or PUSCH scheduled by the DCI, is invalid and continues to perform the DCI detection in the BW-CCH region.

C) Particularly, the above-described operation may be limitedly performed only when a DL grant and/or UL grant is UE-specific. Alternatively, when a DL grant is group-specific, the UE may always assume that the BW-CCH region configured in the corresponding SF is disabled.

2) When DCI (e.g., DL grant and/or UL grant) is not detected in the xPDCCH region, A) the UE determines that the BW-CCH region is valid and assumes that the corresponding SF to be a special DL SF including a BW-CCH region. Thus, the UE performs the DCI detection in the BW-CCH region.

According to the above-described UE reception operation, the DCI detection can be performed both in the xPDCCH and BW-CCH regions. Thus, it is advantageous in that even though a BS configures a BW-CCH region in a certain SF, the SF can be used as a normal DL SF by cancelling signaling overhead of the BW-CCH region if necessary.

3.3.2. Second UE Reception Operation in Beam Sweeping DL Control Region

When a beam sweeping DL control (BW-CCH) region exists in a specific SF, a UE can receive DCI in the corresponding BW-CCH region as follows.

(1) The UE performs DCI detection on all symbols in the BW-CCH region.

(2) The UE performs DCI detection on only a symbol(s) corresponding to the best analog beam(s) (from the perspective of reception).

(3) The UE performs DCI detection until detecting a single piece of DCI in the BW-CCH region. After detecting the single piece of DCI, the UE may stop the DCI detection. This operation may imply that although the DCI is repeatedly transmitted in the BW-CCH region, the UE receives only the single piece of DCI. Alternatively, when at least one piece of DCI is transmitted, the UE may perform the detection until a symbol where the UE succeeds in the detection for the first time.

(4) The UE operates in a similar way as described in operation (3). However, in this case, the UE may perform the detection until a symbol where the UE succeeds in the detection for the second time.

In operation (2), analog beam information that the UE should assume per symbol in the BW-CCH region in order to receive a DL control signal may be predetermined or configured by the BS through system information or a higher layer signal.

More specifically, the following two methods can be considered when the UE attempts the DCI detection in the BW-CCH region.

First, if the BS intends to apply a random analog beam (or analog beam group) to each symbol in the BW-CCH region, the UE may perform the DCI detection on all symbols in the BW-CCH region by assuming its best analog beam without information on analog beams. In this case, the UE assume that the DCI is transmitted via an analog beam corresponding to a configured hearable beam and then attempts the DCI detection on all symbols. However, this operation has a disadvantage in that UE complexity may increase.

As another method, analog beam information that the UE should assume per symbol in the BW-CCH region in order to receive a DL control signal may be predetermined or configured by the BS through system information or a higher layer signal. Therefore, the UE may perform the DCI detection on only a symbol corresponding to the best analog beam. In this case, since the UE performs the DCI detection on only one symbol, this method has an advantage in that DCI detection complexity decreases.

As an example of the above operation, the UE may obtain information on a plurality of analog beams managed by the BS. The information on the plurality of analog beams may be determined between the UE and BS in advance. Alternatively, it may be provided by the BS through system information or a higher layer signal. In this case, the information on the plurality of analog beams may include information on an analog beam applied to each symbol. Thus, using the received information, the UE may attempt the DCI detection on only the symbol where it is expected that the (best) analog beam corresponding to the UE's hearable beam may be transmitted.

Additionally, the information on the plurality of analog beams transmitted from the BS to the UE may be indicated using a Quasi Co-Located (QCL) relationship between an analog beam and a specific SS block (e.g., a PRB block in which an SS is transmitted) or a BRS. In this case, the UE may attempt the DCI detection based on information on an analog beam applied to an indicated specific SS block or BRS.

3.3.3. Third UE Reception Operation in Beam Sweeping DL Control Region

When a beam sweeping DL control (BW-CCH) region exists in a specific SF, a BS can configure a seed value of a Reference Signal (RS) sequence in order for a UE to receive a DL control signal in the BW-CCH region as follows. That is, the UE may receive the DL control signal based on the seed value configured as follows.

(1) A cell ID (or TRP ID)

(2) The BS configures a single seed value for reception in the BW-CCH region (using a higher layer signal).

(3) The BS configures a seed value per symbol for reception in the BW-CCH region (using a higher layer signal).

When the BS configures the seed value of the RS sequence for the BW-CCH region, it may be independent from a seed value of an RS sequence configured for an xPDCCH region.

More specifically, an RS sequence needs to be defined because the UE should assume the RS sequence when attempting DCI detection in the BW-CCH region. In this case, considering that the BW-CCH region includes paging information, system information, or BSI report triggering for a UE group, it may be desirable to configure a cell-common or UE-common RS sequence in the BW-CCH region.

One method of configuring a cell-common RS sequence is to use a cell ID (or TRP ID) as the seed value of the RS sequence in the BW-CCH region. Alternatively, to give the BS flexibility in managing a BW-CCH, the seed value of a single RS sequence for the reception in the BW-CCH region (or the seed value of an RS sequence per symbol) may be configured for each UE.

3.4. UE Operation in Response to Group BSI Report Triggering 3.4.1. UE's First BSI Reporting Method When a BS transmits BSI report triggering to a UE group in a beam sweeping DL control (BW-CCH) region, a UE can transmit a BSI report using an RS resource (e.g., Sounding Reference Signal (SRS)) or a UL control resource (e.g., xPUCCH) UE-specifically defined within one symbol.

In this case, the BS may configure the UE-specific UL control resource or RS resource for each UE according to a predetermined rule or through a higher layer signal.

For example, the BS may configure, for the UE, the UL control resource to be used by the UE to transmit the BSI report according to BSI report triggering DCI, which is transmitted in the BW-CCH region, in advance (during initial access or when configuring a serving beam).

More specifically, the BS may divide an entire UL control region into a plurality of resources, which are distinguished by indices, and inform an index of a resource to be used by the UE for BSI reporting among resources. If the UE is configured to transmit the BSI report using a specific RS resource (e.g., RS frequency resource, RS sequence, etc.), the BS may inform the UE of a set of RS resources corresponding to a plurality of states that can be reported through the BSI report (during the initial access or when configuring the serving beam), and the UE may transmit the BSI report by selecting the specific RS resource corresponding to a BSI report state that the UE should report.

In this case, one of the plurality of states that can be reported through the BSI report may mean M best beam groups (where M≥1) or an RRM measurement value (e.g., xRSRP, xRSRQ, etc.) per best beam (measured using a BRS to which a corresponding analog beam is applied).

If all UEs of the UE group transmit BSI reports, BSI report resources (e.g., UL control resources, RS resources, etc.) of some UEs may collide. However, this collision problem may be mitigated as follows. That is, even though the UEs receive the BSI report triggering, the UEs can transmit their BSI reports only when additional conditions are satisfied as described in section 3.2.2.3.

3.4.2. UE's Second BSI Reporting Method

When a BS transmits BSI report triggering to a UE group in a beam sweeping DL control (BW-CCH) region, a UE can determine a UL SF for transmitting a BSI report and symbol locations in the corresponding SF as follows.

(1) BSI report transmission SF

1) The BSI report transmission SF may be a UL SF derived from an SF in which BSI report triggering DCI is received. For example, if the BSI report triggering DCI is received in the nth SF, the UE may assume the BSI report transmission SF to be the (n+k)th UL SE 2) The BSI report transmission SF may be a UL SF derived from a symbol in which BSI report triggering DCI is received. For example, if the BSI report triggering DCI is received in the 1th symbol of the nth SF, the UE may assume the BSI report transmission SF to be the (n+k+1)th UL SF.

3) The BSI report transmission SF may be a UL SF indicated by BSI report triggering DCI.

4) The BSI report transmission SF may be the earliest UL SF where an analog beam corresponding to BSI report triggering DCI is configured after reception of the corresponding DCI. In this case, the analog beam configured in the UL SF may be valid only when the BS transmits the BSI report triggering DCI corresponding to the corresponding analog beam. In addition, the BS may inform the UE how an analog beam(s) corresponding to the (one or multiple pieces of) BSI report triggering DCI is configured in a DL SF(s) according to a predetermined rule or through system information or a higher layer signal.

(2) UL symbol in which BSI report will be transmitted within BSI report transmission SF 1) The UL symbol may be derived from a symbol in which BSI report triggering DCI is received.

2) The symbol location may be predetermined or configured by a higher layer signal.

3) The symbol location may be indicated by BSI report triggering DCI.

When the BS instructs the UE to transmit the BSI report as described in section 3.2.2.2, the SF and symbol locations in which the UE transmits the BSI report should be defined. In this case, the BSI report transmission SF may be derived from the SF in which the BSI report triggering DCI is received or directly indicated by the BSI report triggering DCI.

Meanwhile, the UL symbol in which the BSI report will be transmitted within the BSI report transmission SF may be one of multiple symbols used for a UL control channel according to the self-contained SF structure shown in FIG. 6. In this case, which symbol in the UL control channel is used may be preconfigured by the BS or indicated through the BSI report triggering DCI.

If a beam sweeping UL control region is introduced as a counterpart of a BW-CCH region, a UE may transmit a BSI report in a corresponding symbol in the beam sweeping UL control region in response to BSI report triggering DCI transmitted in a specific symbol in the BW-CCH region.

More specifically, the UE may transmit the BSI report in the symbol in the beam sweeping UL control region where an analog beam (or analog beam group) identical to that applied to the BSI reporting triggering DCI is applied. In this case, the beam sweeping UL control region may be configured in an SF (or slot) in which a Random Access Channel (RACH) preamble will be transmitted.

After sending the BSI report, the UE may receive DCI indicating a change of its serving beam in the BW-CCH region. In this case, the UE may change the serving beam based on the corresponding DCI. In addition, the UE can guess a time at which the DCI indicating the change of the serving beam is transmitted in the BW-CCH region from a time at which the UE transmits a previous BSI report.

Alternatively, after sending the BSI report, the UE may change its serving beam to the best beam that the UE reports. Thereafter, the UE may perform DCI detection in an xPDCCH region by assuming the corresponding best beam as the serving beam.

3.5. UE Operation in response to BSI-SR Triggering 3.5.1. First Operation

A UE may operate in one of the following two types of Discontinuous Reception (DRX) mode (according to a BS configuration).

(1) First DRX mode: UE-driven best beam synchronization is maintained.

If a UE operates in the first DRX mode, the UE may wake up every predetermined cycle (e.g., DRX cycle) (or every specific time) and measure a BRS. If the best beam is changed (from the perspective of reception) (or if a serving beam configured by a BS is different from the best beam), the UE may send a BSI-SR for BSI reporting.

(2) Second DRX mode: A beam recovery is attempted under BS's guidance.

If a UE operates in the second DRX mode, the UE may wake up every predetermined cycle (e.g., DRX cycle) (or every specific time) and attempt to detect BSI-SR triggering DCI (in a BW-CCH region). Only when the UE detects the BSI-SR triggering DCI, the UE may measure a BRS and send a BSI-SR for BSI reporting.

In this case, to reduce power consumption during a time period in which the UE does not wake up according to the DRX mode, the UE may transmit and receive no signals.

In the LTE system to which the present disclosure is applicable, the DRX mode has been introduced to reduce UE's power consumption. According to the DRX mode, a UE may operate in sleeping mode (where the UE does not communicate with an eNB) during most of the operating time. Meanwhile, during a relatively short time period, the UE may wake up every DRX cycle, check whether there is a PDCCH transmitted to the UE, and receive the PDCCH if transmitted.

In particular, if analog beamforming is introduced to the NR system according to the present disclosure, a UE may perform DRX operation for the purpose of synchronization (between the UE and a BS) for a serving beam similar to the DRX operation in the LTE system.

For example, if the UE has no DL data to receive, the UE may sleep during most of the operating time and wake up periodically. If the best beam is changed (from the perspective of reception), the UE may transmit a BSI-SR for BSI reporting. In this case, DRX mode where the BS instructs the UE to transmit the BSI-SR can be considered as DRX mode applicable to the UE in order to prevent the UE from transmitting the BSI-SR too frequently. In other words, when the UE has no DL data to receive, the UE may sleep during most of the operating time and wake up periodically. Only when the UE detects BSI-SR triggering DCI transmitted from the BS, the UE may measure a BRS and transmit the BSI-SR for the BSI reporting.

Additionally, in the above-described second DRX mode, if a BS has DL data to transmit, the BS may transmit BSI-SR triggering DCI. In this case, a UE may detect the BSI-SR triggering DCI. Alternatively, if the UE has UL data to transmit, the UE may wake up and then transmit a BSI-SR and a relevant BSI report. After receiving a reconfigured serving beam from the BS, the UE may perform UL data transmission.

Similarly, if a UE operates in the first DRX mode or has UL data to transmit, the UE may wake up and then transmit a BSI-SR and a relevant BSI report. After receiving a reconfigured serving beam from a BS, the UE may perform UL data transmission.

3.5.2. Second Operation

When a BS transmits a BSI-SR triggering signal in a sweeping CCH region, a BSI-SR transmission SF(s) and a BSI-SR transmission symbol(s) corresponding to the corresponding signal may be determined according to one of the following methods.

(1) BSI-SR transmission SF

The BSI-SR transmission SF(s) may be a UL SF(s) derived from an SF in which the sweeping CCH region is transmitted.

The BSI-SR transmission SF(s) may be a UL SF(s) derived from a symbol in which the BSI-SR triggering signal in the sweeping CCH region is transmitted.

When BSI-SR triggering is indicated by DCI in the sweeping CCH region, The BSI-SR transmission SF(s) may be a UL SF(s) indicated by the DCI.

(2) BSI-SR transmission symbol (in UL SF)

The BSI-SR transmission symbol may be predetermined or configured through a higher layer signal.

The BSI-SR transmission symbol may be a symbol corresponding to an analog beam (or analog beam group) applied to the BSI-SR triggering signal in the sweeping CCH region.

The BSI-SR transmission symbol(s) may be a symbol(s) derived from the symbol in which the BSI-SR triggering signal in the sweeping CCH region is transmitted.

When the BSI-SR triggering is indicated by the DCI in the sweeping CCH region, the BSI-SR transmission symbol(s) may be a symbol(s) indicated by the corresponding DCI.

More specifically, when the BS transmits the BSI-SR triggering signal in the sweeping CCH region as described above, the UE may transmit a BSI-SR in a BSI-SR transmission region corresponding to the sweeping CCH region after receiving the BSI-SR triggering signal.

In this case, the BSI-SR transmission region may have a similar format to a beam sweeping UL control region where a different (or independent) analog beam can be applied to each symbol. For example, the beam sweeping UL transmission region may be defined to be located after a predetermined time period from a time at which the sweeping CCH region is transmitted. In addition, upon receiving the BSI-SR triggering, the UE may transmit a BSI-SR with a format similar to an RS (with a UE-specific frequency resource and sequence), which is configured by a higher layer signal (or RRC signaling) in advance, in a symbol in the beam sweeping UL transmission region corresponding to the analog beam (or analog beam group) applied to the received BSI-SR triggering signal. After receiving the BSI-SR, the BS transmits BSI report triggering DCI to the UE via the corresponding analog beam again. When receiving the BSI report triggering DCI, the UE may transmit BSI on a UL data resource (e.g., PUSCH) indicated by the BSI report triggering DCI.

Figure 20:
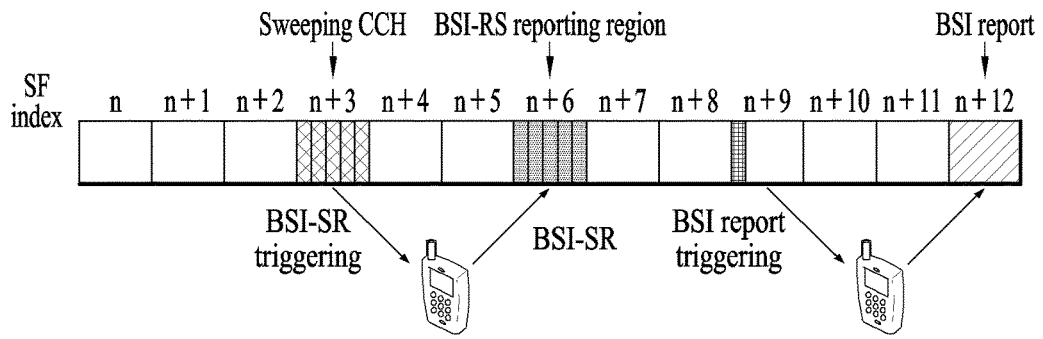
FIG. 20 is a diagram illustrating an overall process in which a BS transmits BSI-SR triggering in a sweeping CCH region and a UE performs BSI reporting according to an embodiment of the present disclosure.

FIG. 20 schematically illustrates an overall process in which a BS transmits BSI-SR triggering in a sweeping CCH region and a UE performs BSI reporting according to an embodiment of the present disclosure.

3.6. Additional Embodiments

Hereinafter, additional embodiments applicable to the above-described operations will be described in detail. Basically, the following configurations are added as supplement to the aforementioned configurations. However, if some configurations are incompatible with the aforementioned configurations, the incompatible configurations can be replaced. In addition, the following configurations can be independently applied regardless of whether the aforementioned configurations are applied or not. In the following, each of the embodiments will be explained in detail.

3.6.1. First Additional Embodiment

When a UE transmits a random access signal and a BS intends to transmit a Random Access Response (RAR) to the UE in response to the random access signal, the BS can transmit RAR scheduling DCI (or the RAR) in a BW-CCH region according to one of the following methods.

(1) The BS repeatedly transmits the RAR scheduling DCI (or RAR) for a specific UE in all (or multiple) symbols in the BW-CCH region.

(2) The BS transmits the RAR scheduling DCI (or RAR) for a specific UE in only a symbol in the BW-CCH region, where an analog beam corresponding to the random access signal previously transmitted by the UE is applied.

In this case, the random access signal transmitted by the UE may be paired with a specific analog beam managed by the BS. In addition, when the RAR scheduling DCI is transmitted in the BW-CCH region, an RAR scheduled in a DL SF (or TTI) corresponding to the BW-CCH region may be transmitted as described in section 3.2.2.1.

More specifically, when a UE performs initial access in a wireless communication system where analog beamforming is applied according to an embodiment of the present disclosure, a BS may not know analog beam information measured by the UE if the BS has no UL link with the UE. In this case, the BS cannot determine which analog beam should be used to allow the UE to receive data. That is, if the UE transmits a random access signal during the initial access and the BS transmits, to the UE, an RAR in response to the random access signal, the BS cannot determine which analog beam should be used to transmit the RAR.

To solve this problem, the BS can repeatedly transmit the RAR or DCI scheduling the RAR in at least one symbol in a BW-CCH region according to the present disclosure. By doing so, in response to the random access signal from the UE, the RAR scheduling DCI (or RAR) can be transmitted via at least one analog beam, and the UE may expect to receive the RAR scheduling DCI (or RAR) in the BW-CCH region. In this case, the UE may attempt to detect the RAR scheduling DCI (or RAR) in all symbols in the BW-CCH region.

Additionally, if the UE transmits a random access signal corresponding to a specific analog beam (e.g., analog beam applied to an SS) managed by the BS, the BS may transmit the RAR scheduling DCI (or RAR) via the analog beam corresponding to the random access signal transmitted from the UE. In this case, the UE may perform RAR detection on all symbols in the BW-CCH region. Alternatively, the UE may attempt to detect the RAR scheduling DCI (or RAR) only in symbols in the BW-CCH region, where the analog beam corresponding to the random access signal transmitted by the UE is applied.

3.6.2. Second Additional Embodiment

When a BS transmits a (BW-CCH-region-specific) signal (e.g., BSI-SR triggering, BSI report triggering DCI, etc.) in a BW-CCH region, the BS and a UE can operate as follows.

(1) In each symbol in the BW-CCH region, the BS may transmit an (aperiodic) RRM RS to which an analog beam corresponding to each symbol is applied according to one of the following methods.

1) When the (BW-CCH-region-specific) signal is transmitted in the BW-CCH region, the (aperiodic) RRM RS is transmitted in all symbol in the corresponding BW-CCH region.

2) The (aperiodic) RRM RS is transmitted in all symbols in the BW-CCH region regardless of whether signal transmission is performed in the BW-CCH region.

(2) The UE may determine how to use the (aperiodic) RRM RS according to one of the following methods.

1) When the UE detects the (BW-CCH-region-specific) signal in the BW-CCH region, the UE assumes that the (aperiodic) RRM RS can be used in all symbols in the BW-CCH region.

2) Regardless of signal detection in the BW-CCH region, the UE assumes that the (aperiodic) RRM RS can be used.

In this case, the BS may inform the UE of analog beam information on the (aperiodic) RRM RS by providing a BRS resource (e.g., BRS port) to which an analog beam used for the corresponding RRM RS is applied.

More specifically, when the UE recognizes that its serving beam fades away or the best beam is changed, the UE may transmit, as a signal for requesting UL transmission resource for BSI reporting, a Beam State Information Scheduling Request (BSI-SR) to the BS as described above. To this end, the BS may transmit to the UE a BSI-SR triggering signal for requesting the BSI-SR transmission in the BW-CCH region. When the BS transmits the BSI-SR triggering signal in the BW-CCH region and the UE receives the BSI-SR triggering signal, the UE may require reception state information of the current analog beams in order to determine whether the UE should transmit the BSI-SR.

In this case, if the BS rarely transmits a BRS (or RRM RS) due to overhead and the like, the UE instructed to transmit the BSI-SR in the BW-CCH region may request UL resources for BSI reporting where time delay is less important.

Alternatively, when the BS transmits a BSI report triggering signal and the UE receives the BSI report triggering signal, the UE may require RRM RS (or BRS) resources for BSI reporting.

Therefore, the present disclosure proposes a method in which when a BS transmits BSI-SR triggering, BSI report triggering, or a BW-CCH-region-specific signal(s) in a BW-CCH region, the BS supports transmission of an aperiodic RRM RS (or BRS) where beam sweeping is applied in order to allow a UE to determine whether the UE should perform BSI-SR transmission based on the most recent channel state. In this case, whether the aperiodic RRM RS is transmitted in the BW-CCH region and how the UE use the aperiodic RRM RS can be determined according to whether the (at least one) BW-CCH-region-specific signal is present in the corresponding BW-CCH region.

3.6.3. Third Additional Embodiment

A BS can transmit DCI indicating whether a BW-CCH region is actually used or not in an SF (or TTI) where the corresponding BW-CCH region is configured. In this case, the DCI may be transmitted in one of the following forms.

(1) UE-common DCI where an analog beam defined in the BW-CCH region is applied is transmitted in the first symbol of the SF (or TTI) where the BW-CCH region is configured (or in some specific symbols located at a front portion of the SF).

(2) UE-specific DCI where a UE-specific serving analog beam is applied is transmitted in the first symbol of the SF (or TTI) where the BW-CCH region is configured (or in some specific symbols located at the front portion of the SF).

(3) UE-common DCI where the analog beam defined in the BW-CCH region is applied is transmitted in each symbol of the SF (or TTI) where the BW-CCH region is configured.

In this case, the UE may detect the DCI indicating whether the BW-CCH region is actually used by assuming the above-described BS operations.

More specifically, after configuring a BW-CCH region in a specific SF (or TTI), the BS may not perform signal transmission using the BW-CCH region in the SE In this case, it may be desirable that the BS cancels the BW-CCH region in the SF (or TTI) and uses the corresponding SF (or TTI) for data transmission if necessary. To support this operation, the BS may transmit DCI indicating validity of the BW-CCH region in the SF (or TTI) where the BW-CCH region is configured.

To allow the UE to rapidly detect whether the BW-CCH region is actually used, the DCI may be transmitted in the first symbol of the SF (or TTI) where the BW-CCH region is configured (or some specific symbols located at the front portion of the SF).

In addition, the DCI may be the UE-common DCI where the analog beam defined in the BW-CCH region is applied as an analog beam for the DCI or the UE-specific DCI where the UE-specific serving beam (i.e., an analog beam configured for data reception) is applied as the analog beam for the DCI.

Alternatively, by transmitting the DCI indicating whether the BW-CCH region is actually used in each symbol in the BW-CCH region, the BS may enable the UE to stop useless signal detection halfway when the BW-CCH region is not used.

3.6.4. Fourth Additional Embodiment

When a BS transmits DCI for system information in a BW-CCH region, the DCI can include at least one piece of the following information.

(1) Information for scheduling some system information: The scheduled system information may be transmitted by applying a plurality of analog beams to a plurality of SFs corresponding to the BW-CCH region as described in section 3.2.2.1.

(2) Information for scheduling some system information and whether each of the remaining system information elements is updated: The scheduled information may be transmitted by applying a plurality of analog beams to a plurality of SFs corresponding to the BW-CCH region as described in section 3.2.2.1.

(3) Whether each of some of the system information elements is updated.

After detecting the DCI for the system information, a UE may request the BS to transmit updated specific system information elements.

More specifically, it is assumed that when system information is updated, a BS repeatedly transmits DCI scheduling the system information in a BW-CCH region using a plurality of analog beams and transmits the system information in a plurality of DL SFs corresponding to the BW-CCH region. However, if a UE operates in transmission mode where the UE does not need to reflect the updated system information, the system information transmitted from the BS may be considered as unnecessary resource waste. To avoid such inefficient system information transmission, the present disclosure proposes the following method: the BS informs whether each system information element is updated, and the UE requests the BS to provide required system information may be considered.

In this case, the BS may inform the UE whether each system information element is updated through DCI in the BW-CCH region. That is, the DCI indicating whether each system information element is updated may be (repeatedly) transmitted in the BW-CCH region.

However, if there is important system information that the UE should always detect, the BS needs to transmit the system information whenever the corresponding information is updated. Therefore, the DCI for the system information may be transmitted in the BW-CCH region, including scheduling information for some essential system information as well as information indicating whether each system information element is updated.

Additionally, when transmitting the DCI for the system information in the BW-CCH region, the BS may also transmit scheduling information for some (essential) system information and scheduling information indicating whether each of the remaining system information elements is updated. After detecting the DCI in the BW-CCH region, the UE may check the essential system information and whether each of the remaining system information elements is updated by demodulating data in a DL SF (or TTI) scheduled by the DCI. Thereafter, the UE may request the BS to transmit updated specific system information.

3.6.5. Fifth Additional Embodiment

When a BS configures for a UE an SF (or TTI) where a BW-CCH region may or may not exist, the UE can perform one of the following detection operations in the SF (or TTI).

(1) The UE performs detection of DL control information for unicast data. In this case, if the UE detects the DL control information for the unicast data, the UE may assume that there is no BW-CCH region in the corresponding SF (or TTI). If the UE does not detect the DL control information for the unicast data, the UE assumes that the BW-CCH region is in the corresponding SF (or TTI) and may perform detection of DL control information (for broadcast data) in the corresponding BW-CCH region.

(2) The UE performs detection of a DL control signal for unicast data first and then performs detection of a DL control signal for the BW-CCH region at all times. In this case, the detection of the DL control signal for the BW-CCH region may be performed only on symbols where an analog beam corresponding to the best beam (from the perspective of reception) or a serving beam is applied.

In the above-described operations, a transmission region of the DL control signal for the unicast data may overlap with the BW-CCH region. In this case, the UE may perform buffering on the overlapping resources.

More specifically, after configuring a BW-CCH region in a specific SF (or TTI), a BS may not perform signal transmission using the BW-CCH region in the SF. In this case, it may be desirable that the BS cancels the BW-CCH region in the SF (or TTI) and uses the corresponding SF (or TTI) for data transmission if necessary.

In this case, to determine whether the specific SF (or TTI) is an SF (or TTI) capable of supporting a BW-CCH region or an SF (or TTI) for transmitting unicast data, a UE may perform detection of a DL control signal. That is, in the SF (or TTI) that may include the BW-CCH region, the UE may attempt to detect a DL control signal indicating unicast data transmission for the purpose of early decoding. If the UE detects the DL control signal, the UE assumes that there is no BW-CCH region. On the other hand, if the UE does not detect the DL control signal, the UE assumes that the BW-CCH region is in the corresponding SF (or TTI) and may attempt to detect DL control information (for broadcast data) in the BW-CCH region.

Hereinafter, an extended example of the above operation will be described. If there are a control channel transmission region/resource (CCH A) related to scheduling of unicast data and a control channel transmission region/resource (CCH B) related to scheduling of UE-group-common or broadcast data in one same SF or (TTI), a UE can perform detection/decoding (i.e., Blind Decoding (BD)) according to one of the following methods. In the present disclosure, it is assumed that the UE-group-common or broadcast data can include system information, paging information, random access responses, etc.

1) The UE performs detection/decoding of DL control information (related to unicast data scheduling) in CCH A.

A) If the UE detects the DL control information (related to the unicast data scheduling) in CCH A, the UE may assume that CCH B (i.e., the control channel transmission region related to UE-group-common or broadcast data scheduling) is not in the corresponding SF (or TTI).

B) On the contrary, if the UE does not detect the DL control information (related to the unicast data scheduling) in CCH A, the UE may assume that CCH B is in the corresponding SF (or TTI) and perform detection/decoding of DL control information (related to the UE-group-common or broadcast data scheduling) in CCH B.

2) The UE always performs the detection/decoding of the DL control information (related to the unicast data scheduling) in CCH A first and then performs the detection/decoding of the DL control information (related to the UE-group-common or broadcast data scheduling) in CCH B.

A) In this case, the UE may perform the detection/decoding of the DL control information only on symbols where an analog beam corresponding to the best beam (from the perspective of reception) or a serving beam is applied in CCH B (i.e., the control channel transmission region related to the UE-group-common or broadcast data scheduling).

Additionally, if there are a data region (DCH A) for transmission of unicast data (for example, a region where the corresponding transmission is scheduled by a random CCH or is configured to be enabled (that is, whether or not the transmission is performed is determined by a UE through BD)) and a data region (DCH B) for transmission of UE-group-common or broadcast data (for example, a region where the corresponding transmission is scheduled by a random CCH or is configured to be enabled (that is, whether or not the transmission is performed is determined by a UE through BD)) in one same SF (or TTI), a UE may always perform detection/decoding and reception in DCH A first and then perform detection/decoding and reception in DCH B.

The reason why a UE performs detection/decoding and reception in a control channel region (or data region) for transmission of unicast data before detection/decoding and reception in a control channel region (or data region) for transmission of UE-group-common or broadcast data is that the UE should perform early decoding to reduce (HARQ) latency of the unicast data scheduling/transmission (compared to the UE-group-common or broadcast data) when processing a received signal (using a limited number of control/data decoders).

Figure 21:
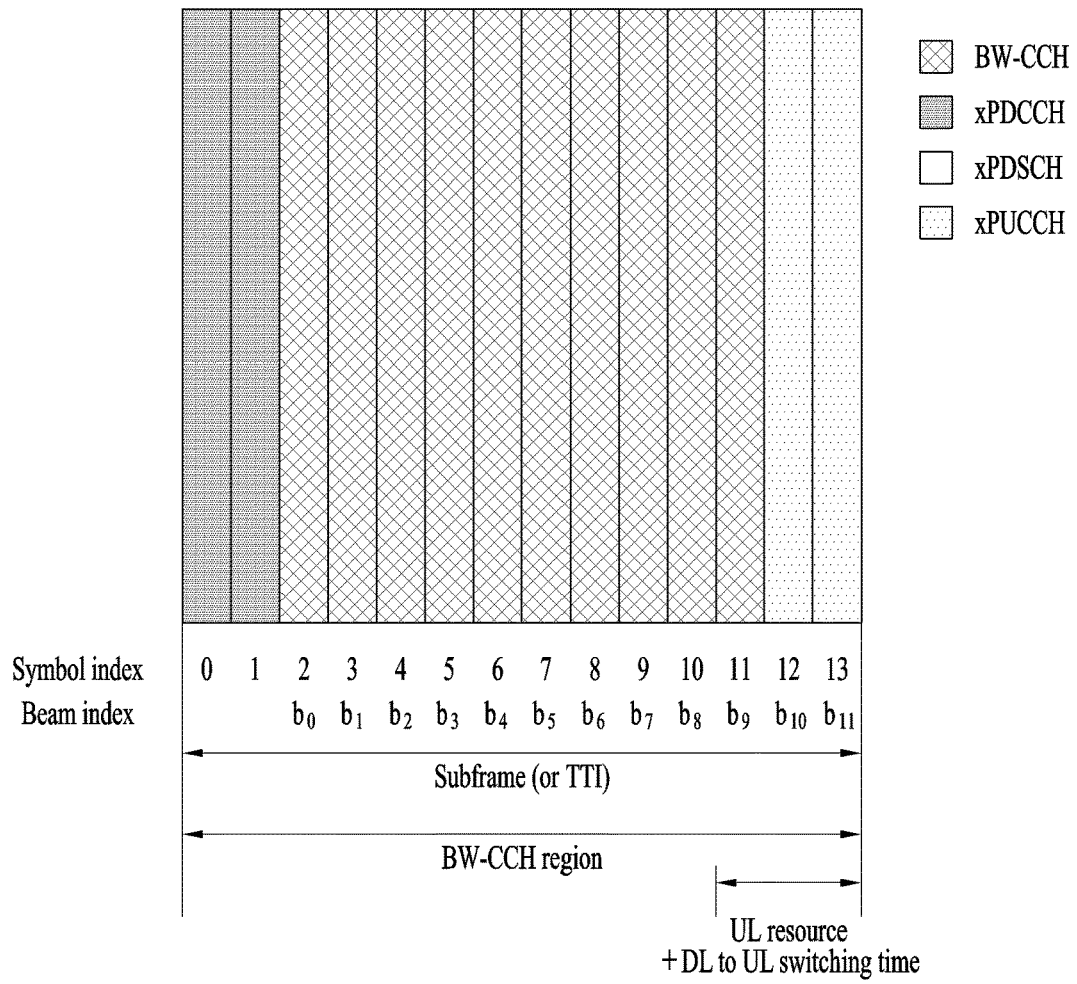
FIG. 21 is a diagram illustrating a case in which a BW-CCH region coexists with an xPUCCH region where HARQ feedback is transmitted.

Here, CCH A may be a PDCCH or an xPDCCH of the LTE system, and CCH B may be a BW-CCH. In this case, a BW-CCH region may be Frequency Division Multiplexed (FDMed) with other channels as shown in FIG. 12 or Time Division Multiplexed (TDMed) with other channels as shown in FIG. 13, FIG. 14, or FIG. 21. However, the above example is merely for convenience of description, and the present disclosure is not limited thereto.

In summary, a UE may perform detection/decoding of DL control information transmitted over a PDCCH or xPDCCH first before detecting/decoding DL control information transmitted in a BW-CCH region.

In this case, when detecting the DL control information transmitted over the PDCCH or xPDCCH, the UE may assume that there is no BW-CCH region. On the contrary, when the UE does not detect the DL control information transmitted over the PDCCH or xPDCCH, the UE may assume that the BW-CCH region is present and perform the detection/decoding of the DL control information transmitted in the BW-CCH region. Alternatively, the UE may perform the detection/decoding of the DL control information transmitted over the PDCCH or xPDCCH first and then perform the detection/decoding of the DL control information transmitted in the BW-CCH region.

3.6.6. Sixth Additional Embodiment

When a BS configures for a UE an SF (or TTI) where a BW-CCH region may or may not exist, if the UE is instructed to perform UL transmission (e.g., UL data/control information transmission, UL RS transmission, etc.) using an entire (or partial) resource region in in the SF (or TTI), the UE can perform one of the following operations in the corresponding SF (or TTI).

(1) The UE ignores the UL transmission instruction.

(2) The UE determines that the entirety of the BW-CCH region is invalid and operates according to the UL transmission instruction.

(3) The UE determines that a part of the BW-CCH region is invalid, performs detection and reception in the remaining BW-CCH region, and operates according to the UL transmission instruction.

(4) The UE performs one of the following operations according to whether there is a resource(s) in the BW-CCH region (overlapping with a UL transmission region).

1) When the resource(s) exists in the BW-CCH region overlapping with the UL transmission region, the UE performs operation (1), (2), or (3) described above.

2) When there is no resource in the BW-CCH region overlapping with the UL transmission region, the UE performs the detection and reception in the BW-CCH region and operates according to the UL transmission instruction.

In this case, the UL transmission region may include a time gap for DL to UL switching, and overlapping between the UL transmission region and the BW-CCH region may mean overlapping between time-domain resources.

In addition, the UL transmission region may be a specific preconfigured resource region where the UE can transmit an (indicated) UL signal or mean a region where the UE actually transmits a UL signal.

More specifically, when a BS configures for a UE candidate SFs (or TTIs) where a BW-CCH region may exist, the BS may instruct the UE to transmit a UL control channel (e.g., xPUCCH) composed of some symbols in the corresponding BW-CCH region. In this case, if the BW-CCH region is configured not to overlap with the region for the UL control channel, it may be desirable that the UE transmits HARQ feedback information on the UL control channel after performing detection and reception in the BW-CCH region.

On the contrary, the BW-CCH region may overlap with the UL transmission region indicated by the BS (in the time domain). In this case, new UE operation needs to be defined. As a simple example, the UE may determine the UL transmission instruction as an erroneous instruction, ignore the UL transmission instruction, and then perform only the detection and reception in the BW-CCH region. Alternatively, by assuming that that the UL transmission instruction also includes that the BW-CCH region is invalid, the UE may only operate according to the UL transmission instruction.

However, to improve resource efficiency in the SF (or TTI) where the BW-CCH region and the UL transmission region coexist, the UE may perform the detection and reception in the remaining BW-CCH region and operate according to the UL transmission instruction by determining that only the partial BW-CCH region (overlapping with the UL transmission region) is invalid. In this case, if transmission of a UL signal such as an xPUSCH, an xPUCCH, etc. is present next to the BW-CCH region, a time gap with a predetermined length may be configured between the BW-CCH region and the UL signal transmission because there is no sufficient time for DL to UL switching. In addition, since the time gap is also required due to the overlap between the BW-CCH region and the UL transmission region, the UL transmission region may include the DL to UL switching time gap.

FIG. 21 illustrates a case in which a BW-CCH region coexists with an xPUCCH region where HARQ feedback is transmitted.

In FIG. 21, the BW-CCH region is configured to include the xPUCCH region. In this case, if a UE is not instructed to perform UL transmission, the UE may perform detection and reception in the entirety of the BW-CCH region. On the other hand, if the UE is instructed to transmit the HARQ feedback in the xPUCCH region, the UE may perform the detection and reception in a part of the BW-CCH region corresponding to symbol indices #2, #3, . . . , #9, #10, performs DL to UL switching in a symbol with symbol index #11, and then transmit the HARQ feedback information in the xPUCCH region corresponding to symbol indices #12 and #13.

Additionally, the above-described operations can be extensively applied when a BW-CCH region is replaced with a DL transmission region from a more general perspective.

In other words, according to the present disclosure, when a UE is instructed to perform UL transmission (e.g., UL data/control information transmission, UL RS transmission, etc.) using all (or some) of the resources in an SF (or TTI) among candidate SFs (or TTIs) where DL transmission may be present, the UE may perform one of the following operations, which are more general versions of the above-described operations, in the SF (or TTI) (where a BW-CCH region is replaced with a DL transmission region).

(A) The UE ignores the UL transmission instruction.

(B) The UE determines that the entirety of the DL transmission region is invalid and operates according to the UL transmission instruction.

(C) The UE determines that a part of the DL transmission region is invalid, performs detection and reception in the remaining DL transmission region, and operates according to the UL transmission instruction.

(D) The UE performs one of the following operations according to whether there is a resource(s) in the DL transmission region (overlapping with a UL transmission region).

A) When the resource(s) exists in the DL transmission region overlapping with the UL transmission region, the UE performs operation (A), (B), or (C) described above.

B) When there is no resource in the DL transmission region overlapping with the UL transmission region, the UE may perform the detection and reception in the DL transmission region and operate according to the UL transmission instruction.

In this case, the UL transmission region may include a time gap for DL to UL switching, and overlapping between the UL transmission region and the DL transmission region may mean overlapping between time-domain resources.

In addition, the UL transmission region may be a specific preconfigured resource region where the UE can transmit an (indicated) UL signal or mean a region where the UE actually transmits a UL signal.

3.6.7. Seventh Additional Embodiment

Figure 22:
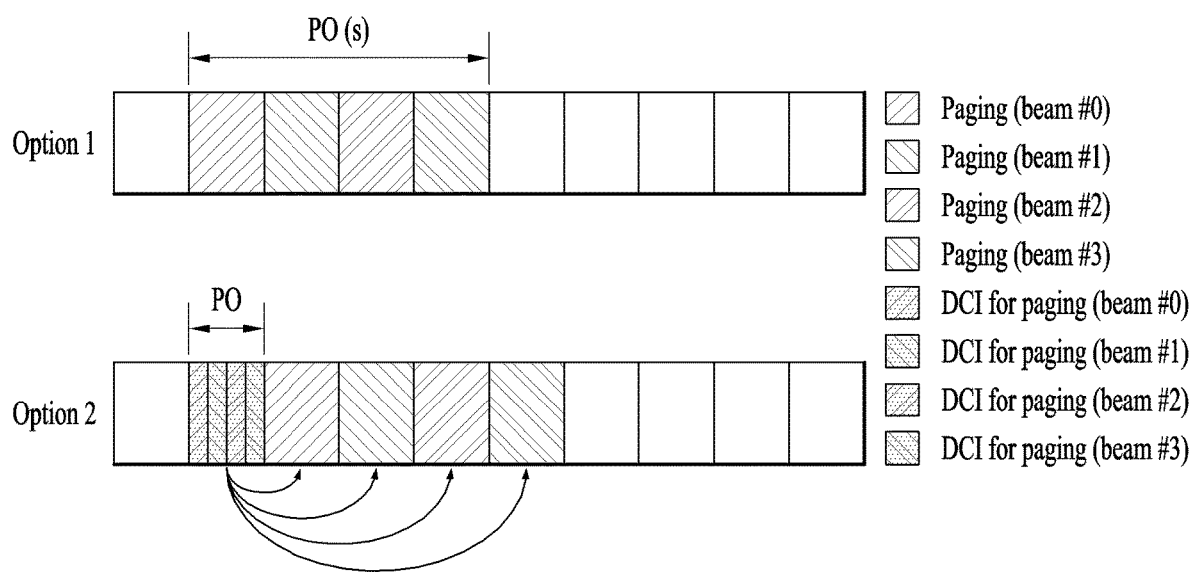
FIG. 22 is a diagram illustrating an operation in which a BS transmits paging signals using multiple beams according to the present disclosure.

FIG. 22 illustrates an operation in which a BS transmits paging signals using multiple beams according to the present disclosure.

Referring to FIG. 22, a BS may transmit paging signals using Option 1 or Option 2. In Option 1, the BS may transmit a paging signal via each beam on a Paging Occasion (PO) composed of a total of four periods. Meanwhile, in Option 2, the BS may transmit a DL grant (e.g., DCI) for paging per beam on a PO composed of a single period and transmit a paging signal per beam during a period scheduled by the DL grant.

That is, according to option 2, it is possible to obtain a gain in terms of UE energy saving due to the reduced PO.

In order to improve paging channel performance, combining of DCI for paging over different beams can be considered. Similarly, combining of paging messages over different beams can also be considered, as long as the contents are the same over multiple beams. If the specification determines that the DCIs for paging over different beams are the same, then UE combines the DCIs for different beams by default. Otherwise, a flag each DCIs for paging can indicate whether the UE can combine DCIs or not.

That is, if multiple pieces of DCI are transmitted on multiple time resources (for multiple beams) in a specific control region (e.g., BW-CCH region), a UE may perform combining of the multiple pieces of DCI on the multiple time resources as a default operation. Alternatively, if a BS indicates a mode capable of selecting DCI combing, the UE may determine whether the multiple pieces of DCI transmitted on the multiple time resources (for the multiple beams) can be combined (based on flags in the multiple pieces of DCI, which will be described in the eight additional embodiment).

3.6.8. Eighth Additional Embodiment

When a BS transmits multiple pieces of DCI on multiple time resources (for multiple beams) in a specific control region (e.g., BW-CCH region), the BS can inform a UE whether the same DCI is repeatedly transmitted on the multiple time resources (for the multiple beams) (or whether multiple pieces of DCI transmitted on different time resources among the multiple time resources (for the multiple beams) can be combined with each other) by including a flag bit in DCI. In this case, the UE can perform one of the following operations based on the flag bit in the DCI.

(1) A case in which the flag bit in the DCI is '0' (or '1')

1) Option 1: The UE may combine multiple pieces of DCI with the same flag bit '0' as the DCI on the multiple time resources (for the multiple beams). Here, combining targets may be limited to targets with the same DCI message.

2) Option 2: The UE may assume that DCI with the same message as the DCI is transmitted on each of the multiple time resources (for the multiple beams) and then combine the multiple pieces of DCI transmitted on the multiple time resources (for the multiple beams).

(2) A case in which the flag bit is '1' (or '0')

1) The UE may determine that there is no DCI that can be combined with the DCI on the multiple time resources (for the multiple beams).

In the above-described operations, the beam may mean an analog beam, a hybrid beam (analog beam+digital beam), and/or a digital beam. In addition, a specific beam may be represented by a specific index value or a specific time resource.

Moreover, the aforementioned combining operation may mean symbol-level combining or soft-bit-level combining.

More specifically, if a BS transmits signals such as paging on multiple time resources via multiple beams, a UE may be configured to obtain a diversity gain in the beam domain by receiving the signals via the multiple beams. In this case, the UE should know whether the BS transmits the same DCI on the multiple time resources for the multiple beams (or whether the UE can perform combining of multiple pieces of DCI on the multiple time resources for the multiple beams) in order to obtain the diversity gain in the beam domain as intended by the BS.

Therefore, the present disclosure proposes a method in which when a BS transmits multiple pieces of DCI on multiple time resources for multiple beams based on beam sweeping, the BS indicates whether combining of the multiple pieces of DCI (on the multiple time resources) via the multiple beams is possible or not using a flag bit in DCI. In other words, a BS may inform a UE whether DCI messages transmitted via multiple beams (or on multiple time resources) can be combined with each other through a flag in DCI. In this case, the UE may perform DCI combining and message combing only for DCI and messages where combining is possible. However, this operation may be performed on the premise that the messages contain the same information.

As an additional example of the above operation, a BS may receive a UE-group-specific (or UE-specific) UL signal from a UE first and then transmit a DL control signal or a DL message on a resource corresponding to the received UL signal among multiple time resources (for multiple beams) in a control region where a different beam can be applied on a short-time basis (based on beam sweeping) such as a BW-CCH region. In this case, a DL control signal or a DL message such as paging, which is transmitted on a specific time resource corresponding to a specific beam, may be configured UE-specifically, UE-group-specifically, or beam-specifically.

As described above, the present disclosure proposes a method in which a BS transmits DCI to at least one UE by applying beam sweeping and a method in which a UE receives DCI, which is transmitted after applying beam sweeping, using a serving beam configured for (or applied to) the UE.

More specifically, a BS transmits DCI to one or more UEs using analog beams independently determined per at least one symbol in a resource region where the DCI is transmitted. In this case, the resource region, which is predetermined, may correspond to a BW-CCH region.

As described above, the BW-CCH region may be predetermined by configurations between the BS and the one or more UEs. Alternatively, to inform the one or more UEs of the BW-CCH region, the BS may transmit information on the resource region where the DCI is transmitted.

In this case, the resource region where the DCI is transmitted corresponds to (or is composed of) one or more time units (e.g., SFs or TTIs) as shown in FIG. 12. Alternatively, the resource region may be composed of some symbols of one or more time units as shown in FIG. 13 or FIG. 14.

If the resource region where the DCI is transmitted corresponds to one or more time units, the information on the resource region may include the number of consecutive time units; and periodicity or offset information applied to the resource region. In addition, when the resource region where the DCI is transmitted is composed of one or more time units, time resources in the resource region where the DCI is transmitted may be identical to those for transmitting a Synchronization Signal (SS) or a Beam Reference Signal (BRS). The DCI may be transmitted to the one or more UEs using an analog beam identical to that applied to the SS or the BRS per at least one symbol.

On the other hand, when the resource region where the DCI is transmitted corresponds to several symbols in one or more time units, the information on the resource region may include information on a set composed of the one or more time units and information on locations of the several symbols included in the set composed of the one or more time units. In this case, time resources in the resource region where the DCI is transmitted are different from those for a control signal (e.g., xPDCCH) for data transmission to some or all of the one or more UEs. For example, the resource region (e.g., BW-CCH region) where the DCI is transmitted may be located after the xPDCCH as shown in FIG. 13 or FIG. 14.

According to the present disclosure, the DCI transmitted by the BS using the beam sweeping method (where signals are transmitted using analog beams independently determined per symbol) may include: first control information scheduling paging information; second control information scheduling system information; third control information indicating detection of a control channel region for downlink data transmission; fourth control information triggering BSI reporting; and fifth control information scheduling uplink signal transmission.

For example, if the DCI includes any of the first control information, the second control information, and third control information, the BS may transmit downlink signals scheduled by the included information (e.g., paging information, system information, or other downlink signals) to some or all of the one or more UEs.

As another example, if the DCI includes any of the fourth information and the fifth information, the BS may receive uplink signals scheduled by the DCI (e.g., BSI measurement result, uplink data, etc.) from some or all of the one or more UEs.

In this case, the contents of the DCI may be repeatedly transmitted using the analog beam independently determined per at least one symbol.

According to the present disclosure, the BS may transmit to the one or more UEs information on the analog beam applied per at least one symbol in order for the BS to transmit the DCI.

In this case, the information on the analog beam applied per at least one symbol in order for the BS to transmit the DCI may include information indicating that the analog beam applied per at least one symbol is Quasi Co-Located (QCLed) with a resource block in which a specific Synchronization Signal (SS) is transmitted or a Beam Reference Signal (BRS).

Meanwhile, one UE may receive DCI, which a BS transmits by applying the beam sweeping method, according to the following method.

The UE receive the DCI, which is transmitted through an analog beam corresponding to a configured serving beam (or a current hearable beam of the UE) in at least one symbol in a resource region where the DCI is transmitted, using the serving beam (or the hearable beam).

In this case, the UE may receive information on the resource region where the DCI is transmitted as described above.

In addition, the DCI received from the BS may include various control information (e.g., first to fifth control information) as described above.

If the DCI includes the fourth control information triggering the BSI reporting, the UE according to the present disclosure may operate as follows.

For example, the UE may transmit BSI to the BS using a UE-specific uplink control resource or a reference signal resource in one symbol. To this end, the BS may divide an entire UL control region into a plurality of resources, which are distinguished by indices, and configure or indicate an index of a resource to be used by the UE for the BSI reporting among resources. In this case, the configuration or indication may be transmitted through separate signaling.

As another example, the UE may determine a location of a time period in which the UE should perform the BSI reporting based on a location of the symbol in which the DCI is transmitted or an index of a time unit including the symbol. Thereafter the UE may perform the BSI reporting during the time period. Specifically, when the DCI is received in the 1th symbol of the nth SF, the UE may perform the BSI reporting in the (n+k+1)th SF (where the value of k may be set by the BS, for example k=4).

As a further example, the UE may perform the BSI reporting during a time period indicated by the DCI.

In addition, the DCI transmitted from the BS to the UE may include Beam State Information-Scheduling Request (BSI-SR) triggering information.

In this case, the DCI may be transmitted as UE-specific DCI or a UE-specific reference signal. For example, when the DCI is transmitted as the UE-specific reference signal, the DCI may be transmitted by applying a UE-specific sequence.

Moreover, when the DCI includes the BSI-SR triggering information, the DCI may be transmitted by applying a Radio Network Temporary Identifier (RNTI) corresponding to a group consisting of a plurality of UEs. Further, the DCI may include a plurality of bit fields corresponding to the individual UEs of the group. In this case, upon receiving the DCI, the UE determines whether the RNTI corresponds to a group to which the UE belongs. If the RNTI corresponds to the group to which the UE belongs, the UE may determine whether BSI-SR triggering is for the UE using a bit field for the UE among the plurality of bit fields.

Additionally, the UE according to the present disclosure may attempt to receive the DCI transmitted from the BS while operating in DRX mode. Specifically, while operating in the DRX mode, the UE may attempt to receive the DCI by switching to a wake-up state every predetermined cycle.

In this case, if the received DCI includes the BSI-SR triggering information for the UE, the UE may transmit a BSI-SR for Beam Reference Signal (BRS) measurement and the BSI reporting.

Further, the UE may receive control information triggering the BSI reporting from the BS in response to the BSI-SR and transmit the BSI measured on an uplink data resource indicated by the received control information triggering the BSI reporting. This series of operations are illustrated in FIG. 20.

Additionally, the DCI transmitted from the BS to the UE may include either or both of control information only for the UE and control information for one or more UEs including the UE. In this case, the UE may detect and receive the control information only for the UE first before detecting and receiving the control information for the one or more UEs including the UE.

Since each of the examples of the proposed methods can be considered as one method for implementing the present disclosure, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a BS to a UE through a predefined signal (e.g., physical layer signal, higher layer signal, etc.).

4. Device Configuration

Figure 23:
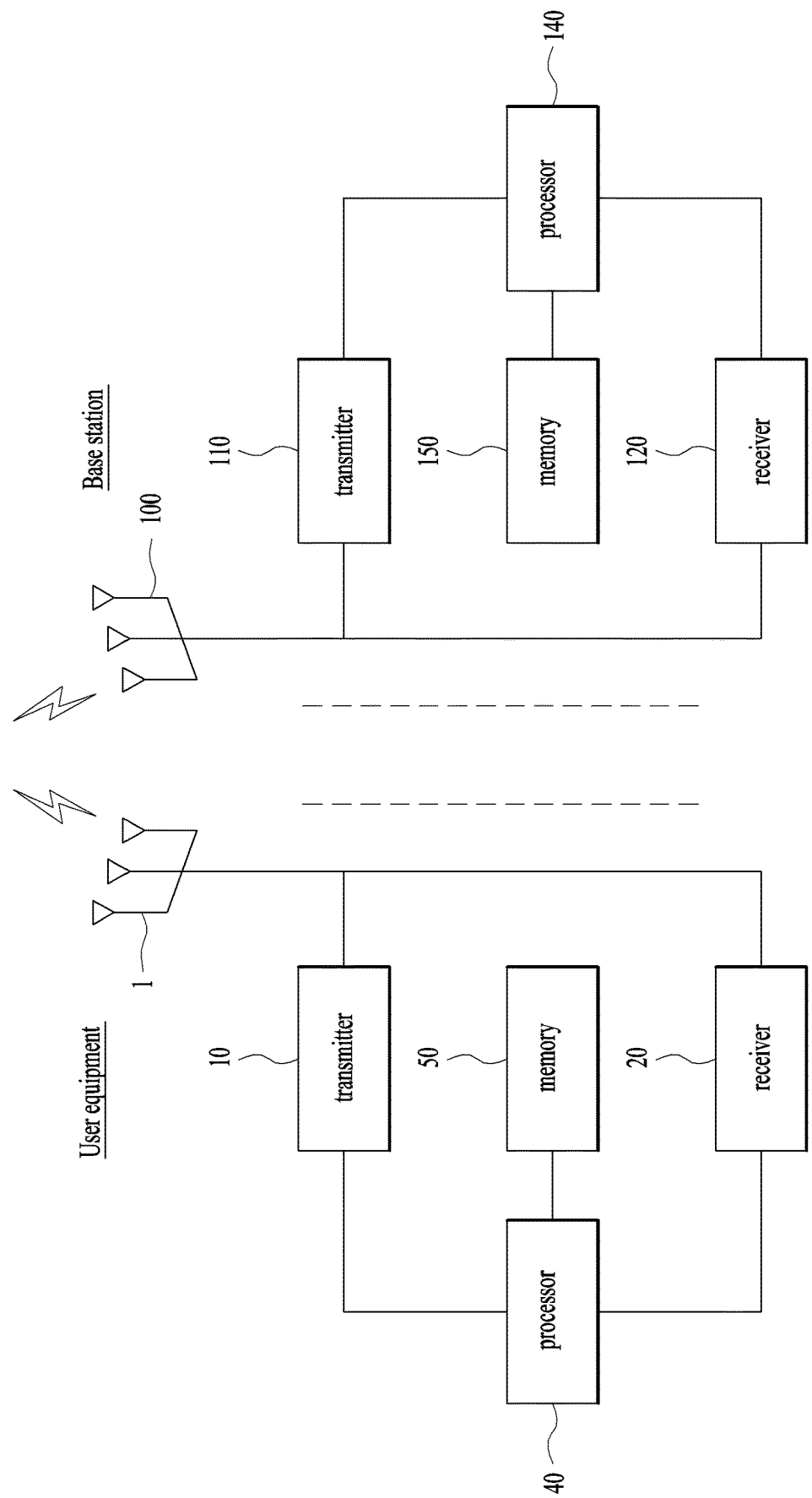
FIG. 23 is a diagram illustrating configurations of a UE and a BS for implementing the proposed embodiments.

FIG. 23 illustrates configurations of a UE and a BS for implementing the proposed embodiments. The UE and BS illustrated in FIG. 23 operate to implement the embodiments of the method of transmitting and receiving DCI between a UE and a BS.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the BS 100 may transmit DCI to one or more UEs 1 using an analog beam dependently determined per at least one symbol as follows.

Specifically, the BS 100 may transmit the DCI to the one or more UEs 1 through the transmitter 110 using the analog beam independently determined per at least one symbol in a resource region where the DCI is transmitted. Thereafter, the BS 100 may receive Beam State Information (BSI) or other uplink signals from some or all of the one or more UEs through the receiver 120 according to contents of the DCI or transmit paging information, system information, or other downlink signals to some or all of the one or more UEs through the transmitter 110.

In addition, a specific UE 1 may receive DCI, which is transmitted via an analog beam corresponding to a serving beam applied to the specific UE 1 (or a hearable beam) in at least one symbol in a resource region where the DCI is transmitted, through the receiver 20 using the serving beam (or the hearable beam). Thereafter, the specific UE 1 may transmit Beam State Information (BSI) or another uplink signal to the BS 100 through the transmitter 10 according to contents of the DCI or receive paging information, system information, or another downlink signal scheduled by the DCI from the BS through the receiver 20.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting downlink control information (DCI) to one or more User Equipment (UEs) by a Base Station (BS) in a wireless communication system, the method comprising:
    transmitting information related to a first Time Transmission Interval (TTI) including a Beam Sweeping Downlink Control (BW-CCH) region;
    transmitting, via the first TTI, the DCI using an analog beam among a plurality of analog beams, wherein the DCI is for requesting a Beam State Information (BSI) report; and
    receiving, via a second TTI, the BSI report based on the DCI,
    wherein the second TTI is an earliest TTI among TTIs related to the same analog beam of the first TTI, and the TTIs are located after the first TTI.

2. The method of claim 1,
    wherein the DCI is transmitted by applying a Radio Network Temporary Identifier (RNTI) to a group consisting of a plurality of UEs, and
    wherein the DCI includes bit fields for the individual UEs of the group.

3. The method of claim 1, wherein the information includes a number of consecutive TTIs for the BW-CCH region and offset information applied to the BW-CCH region.

4. The method of claim 1, wherein, based on first time resources in the BW-CCH regions being identical to second time resources for a Synchronization Signal (SS) or a Beam Reference Signal (BRS), the same analog beam is used for the first time resources and the second time resources.

5. The method of claim 1, wherein the information includes symbol indexes used for the BW-CCH within the first TTI.

6. The method of claim 5, wherein DCI scheduling data is transmitted via symbols having symbol indexes other than the symbol indexes included in the information.

7. The method of claim 1, wherein the DCI is UE-specific DCI.

8. A method of receiving downlink control information (DCI) from a Base Station (BS) by a User Equipment (UE) in a wireless communication system, the method comprising:
    receiving information related to a first Time Transmission Interval (TTI) including a Beam Sweeping Downlink Control (BW-CCH) region;
    receiving, via the first TTI, the DCI using an analog beam among a plurality of analog beams, wherein the DCI is for requesting a Beam State Information (BSI) report; and
    receiving, via a second TTI, the BSI report based on the DCI,
    wherein the second TTI is an earliest TTI among TTIs related to the same analog beam of the first TTI, and the TTIs are located after the first TTI.

9. The method of claim 8, wherein the UE transmits the BSI to the BS using a UE-specific uplink control resource.

10. The method of claim 8, wherein a location of a time period in which the BSI is transmitted is determined based on a location of the symbol in which the DCI is transmitted.

11. The method of claim 8, wherein the DCI further includes information on a location of a time period in which the BSI is transmitted.

12. A User Equipment (UE) for receiving downlink control information from a Base Station (BS) in a wireless communication system, the UE comprising:
    a transmitter;
    a receiver; and
    a processor connected to the transmitter and the receiver,
    wherein the processor is configured to:
    receive information related to a first Time Transmission Interval (TTI) including a Beam Sweeping Downlink Control (BW-CCH) region;
    receive, via the first TTI, the DCI using an analog beam among a plurality of analog beams, wherein the DCI is for requesting a Beam State Information (BSI) report; and
    receive, via a second TTI, the BSI report based on the DCI,
    wherein the second TTI is an earliest TTI among TTIs related to the same analog beam of the first TTI, and the TTIs are located after the first TTI.

* * * * *